United States Patent
Inoue et al.

(10) Patent No.: US 9,876,728 B2
(45) Date of Patent: Jan. 23, 2018

(54) PACKET PROCESSING APPARATUS, PACKET PROCESSING METHOD, AND PACKET PROCESSING SYSTEM

(71) Applicant: FUJITSU LIMITED, Kawasaki-shi, Kanagawa (JP)

(72) Inventors: Yoshinobu Inoue, Kawasaki (JP); Nobuhiko Fukuda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 14/510,576

(22) Filed: Oct. 9, 2014

(65) Prior Publication Data

US 2015/0124834 A1 May 7, 2015

(30) Foreign Application Priority Data

Nov. 6, 2013 (JP) .................................. 2013-230518

(51) Int. Cl.
*H04L 12/865* (2013.01)
*H04L 12/863* (2013.01)
*H04L 12/841* (2013.01)
*H04L 12/26* (2006.01)

(52) U.S. Cl.
CPC ........ *H04L 47/6215* (2013.01); *H04L 43/026* (2013.01); *H04L 47/28* (2013.01)

(58) Field of Classification Search
CPC .... H04L 47/56; H04L 47/628; H04L 47/6275
See application file for complete search history.

(56) References Cited

U.S. PATENT DOCUMENTS

| 5,293,486 A * | 3/1994 | Jordan | ................ G06F 9/5016 710/220 |
| 2010/0271944 A1* | 10/2010 | Michaelis | ............... H04L 45/24 370/230.1 |

FOREIGN PATENT DOCUMENTS

| JP | 1-209839 | 8/1989 |
| JP | 11-24779 | 1/1999 |
| JP | 2002-354009 | 12/2002 |
| JP | 2003-32297 | 1/2003 |
| JP | 2009-253520 | 10/2009 |

OTHER PUBLICATIONS

Japanese Office Action dated Feb. 28, 2017 in Japanese Patent Application No. 2013-230518.

* cited by examiner

*Primary Examiner* — Rhonda Murphy
(74) *Attorney, Agent, or Firm* — Staas & Halsey LLP

(57) ABSTRACT

A first cache stores preferential packets to be preferentially processed. A second cache stores packets other than the packets stored in the first cache. A processing circuit adjusts the number of preferential packets stored in the first cache in a manner such that the preferential packets are processed at the amount of processing that is equal to or less than a set value set as the amount of processing applicable to the preferential packets within a predetermined period, processes the packets stored in the first cache, and reads from the second cache as many packets as are processable at a surplus value, and processes the read packets, the surplus value being obtained by subtracting the amount of processing to be applied to the preferential packets stored in the first cache from the amount of processing that the processing circuit is capable of performing within the predetermined period.

7 Claims, 22 Drawing Sheets

| FLOW IDENTIFICATION NUMBER | SOURCE IP ADDRESS | DESTINATION IP ADDRESS | PROTOCOL | SOURCE PORT NUMBER | DESTINATION PORT NUMBER | IPsec SPI |
|---|---|---|---|---|---|---|
| 0 | ARBITRARY | ARBITRARY | ARBITRARY | ARBITRARY | ARBITRARY | — |

24b

| FLOW IDENTIFICATION NUMBER | SOURCE IP ADDRESS | DESTINATION IP ADDRESS | PROTOCOL | SOURCE PORT NUMBER | DESTINATION PORT NUMBER | IPsec SPI |
|---|---|---|---|---|---|---|
| 0 | ARBITRARY | ARBITRARY | ARBITRARY | ARBITRARY | ARBITRARY | — |
| 1 | 10.0.0.1 | 10.0.0.2 | IPsec | — | — | 1001 |
| 2 | 10.0.0.2 | 10.0.0.1 | IPsec | — | — | 1001 |

25a

| FLOW IDENTIFICATION NUMBER | RESERVATION STATUS | PROCESS TYPE | EXPECTED NUMBER OF PROCESS STEPS (PACKET) | AMOUNT OF ACCESS MEMORY (PACKET) |
|---|---|---|---|---|
| 0 | BEST EFFORT | L3 RELAY | 600 | 768 |

25b

| FLOW IDENTIFICATION NUMBER | RESERVATION STATUS | PROCESS TYPE | EXPECTED NUMBER OF PROCESS STEPS (PACKET) | AMOUNT OF ACCESS MEMORY (PACKET) |
|---|---|---|---|---|
| 0 | BEST EFFORT | L3 RELAY | 600 | 768 |
| 1 | RESERVED | IPsec ENCODING | 2000 | 1024 |
| 2 | RESERVED | IPsec DECODING | 2000 | 1024 |

FIG. 5

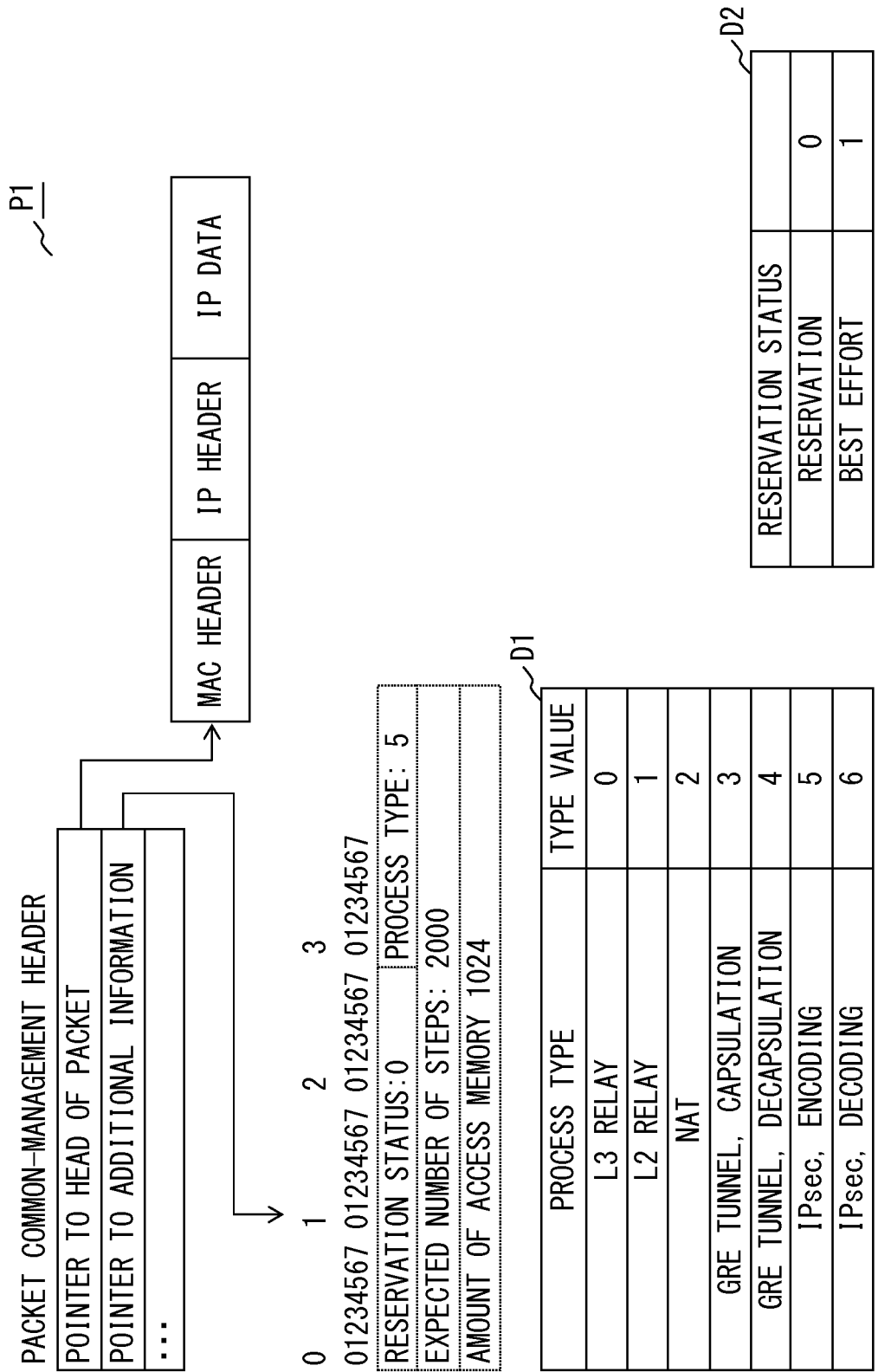

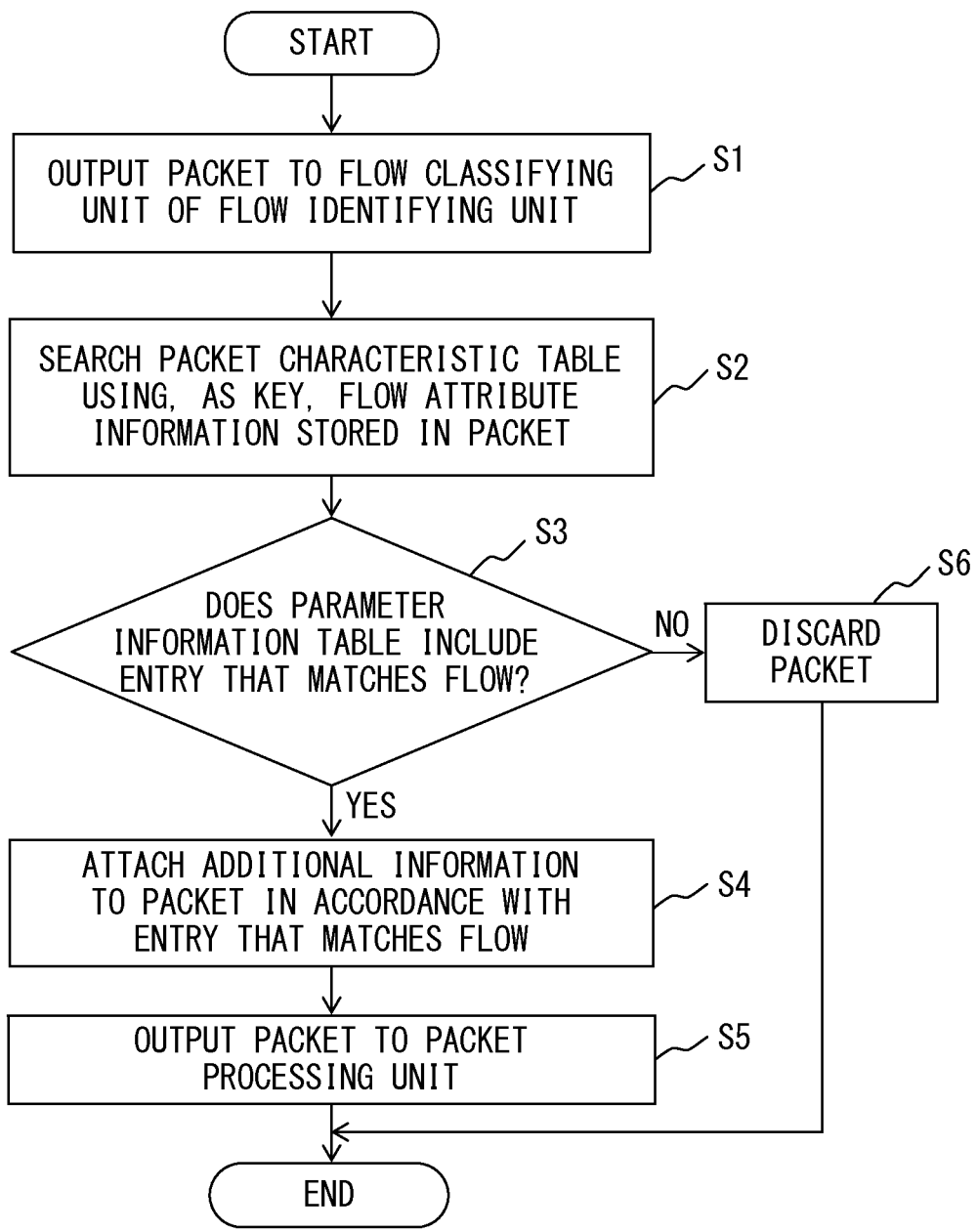
F I G. 7

| | PROCESS TYPE | CORRECTION FORMULA (PROCESS STEPS OF ADDITIONAL INFORMATION=A) |
|---|---|---|
| 1 | IPsec ENCODING, DECODING | A+DATA LENGTH x10 |
| 2 | COMPRESSION, DECOMPRESSION | A+DATA LENGTH x8 |

| NUMBER OF ALLOCATED STEPS/SECOND | TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 20000000 | 0 | 20000000 | 2000000 | 0 | 2000000 |

33b

| NUMBER OF ALLOCATED STEPS/SECOND | TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 20000000 | 5560 | 19994440 | 2000000 | 1024 | 1998976 |

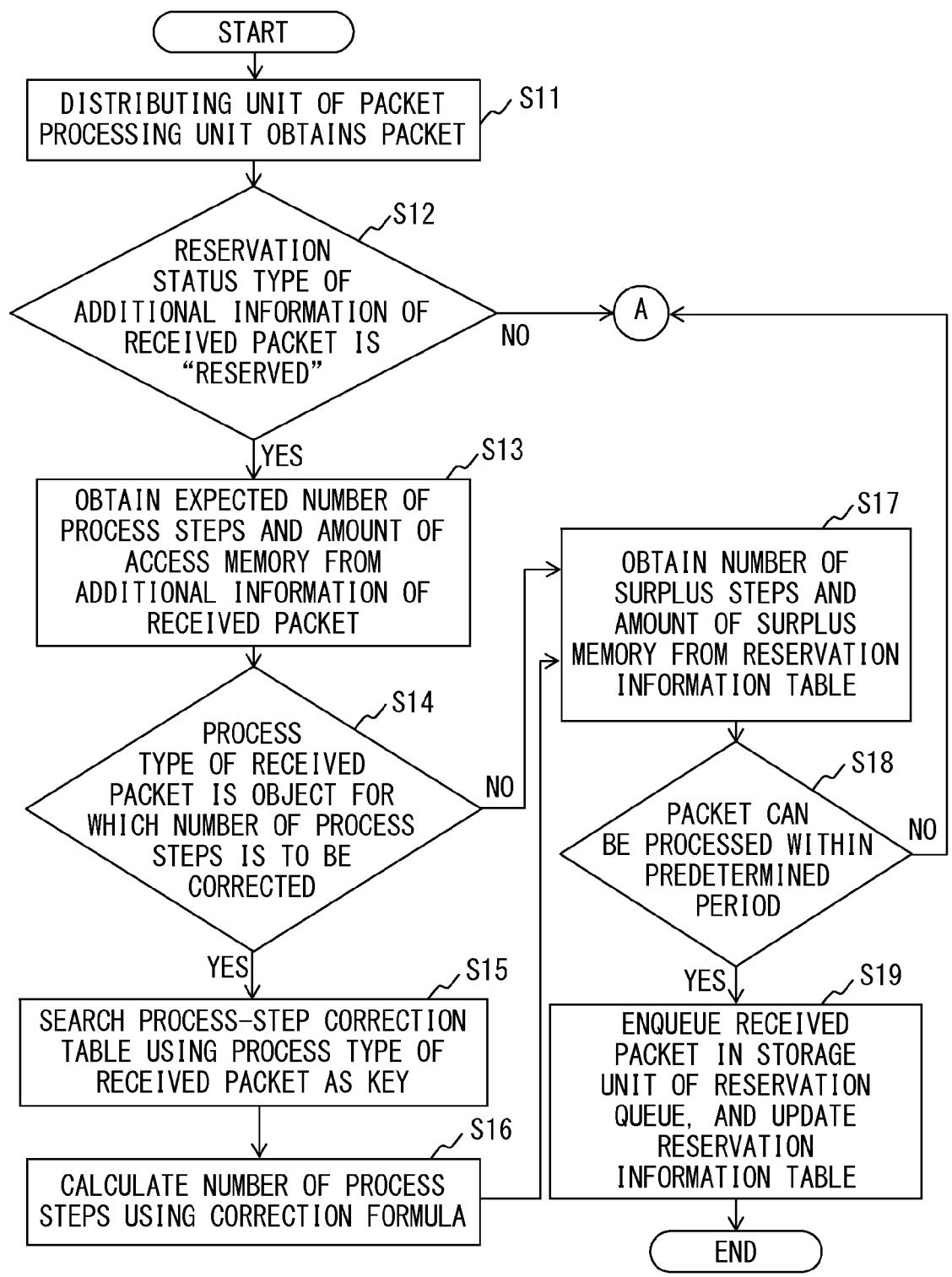
F I G. 1 0 A

35a

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 200 MILLION | 0 | 200 MILLION | 2000000 | 0 | 20000000 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 0% | 10% | 0 | 1.44 TRILLION |

35b

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 200 MILLION | 200 MILLION | 0 | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 15% | 10% | 200 MILLION | 1.44 TRILLION |

| NUMBER OF ALLOCATED STEPS/ SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | | AMOUNT OF CONSUMED MEMORY (BYTE) | AMOUNT OF SURPLUS MEMORY (BYTE) |
|---|---|---|---|---|---|---|
| 210 MILLION | 200 MILLION | 0 | 2000000 | | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR | |
| 200 MILLION | 1 BILLION | 15% | 10% | 200 MILLION | 1.44 TRILLION | |

35d

| NUMBER OF ALLOCATED STEPS/ SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | | AMOUNT OF CONSUMED MEMORY (BYTE) | AMOUNT OF SURPLUS MEMORY (BYTE) |
|---|---|---|---|---|---|---|
| 210 MILLION | 210 MILLION | 0 | 2000000 | | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR | |
| 200 MILLION | 1 BILLION | 10% | 10% | 410 MILLION | 1.44 TRILLION | |

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 980 MILLION | 980 MILLION | 0 | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 20% | 10% | 892.3 BILLION | 1.44 TRILLION |

35f

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 1 BILLION | 980 MILLION | 0 | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 29% | 10% | 892.3 BILLION | 1.44 TRILLION |

35g

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | | AMOUNT OF CONSUMED MEMORY (BYTE) | AMOUNT OF SURPLUS MEMORY (BYTE) |
|---|---|---|---|---|---|---|
| 1 BILLION | 850 MILLION | 150 MILLION | 2000000 | | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR | |
| 200 MILLION | 1 BILLION | 0% | 10% | 1.44 TRILLION | 1.44 TRILLION | |

35h

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | | AMOUNT OF CONSUMED MEMORY (BYTE) | AMOUNT OF SURPLUS MEMORY (BYTE) |
|---|---|---|---|---|---|---|
| 200 MILLION | 850 MILLION | 0 | 2000000 | | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR | |
| 200 MILLION | 1 BILLION | 0% | 10% | 1.44 TRILLION | 1.44 TRILLION | |

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 200 MILLION | 200 MILLION | 0 | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 120% | 10% | 1.44 TRILLION | 1.44 TRILLION |

35j

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 200 MILLION | 200 MILLION | 0 | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 120% | 10% | 0 | 1.44 TRILLION |

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 450 MILLION | 200 MILLION | 250 MILLION | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 0% | 10% | 158.2 BILLION | 1.44 TRILLION |

35m

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 360 MILLION | 200 MILLION | 160 MILLION | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 0% | 10% | 158.2 BILLION | 1.44 TRILLION |

35n

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 205 MILLION | 50 MILLION | 155 MILLION | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 0% | 10% | 419.9 BILLION | 1.44 TRILLION |

35p

| NUMBER OF ALLOCATED STEPS/SECOND | CUMULATIVE-TOTAL NUMBER OF CONSUMED STEPS/SECOND | NUMBER OF SURPLUS STEPS/SECOND | AMOUNT OF ALLOCATED ACCESS MEMORY (BYTE) | AMOUNT OF CONSUMED MEMORY (BYTE) | AMOUNT OF SURPLUS MEMORY (BYTE) |
|---|---|---|---|---|---|
| 200 MILLION | 50 MILLION | 150 MILLION | 2000000 | 1024 | 1998976 |
| STANDARD NUMBER OF STEPS/SECOND | UPPER LIMIT OF NUMBER OF STEPS/SECOND | RE-ENQUEUE RATE | UPPER LIMIT OF RE-ENQUEUE RATE | CUMULATIVE-TOTAL NUMBER OF STEPS/HOUR | UPPER LIMIT OF CUMULATIVE-TOTAL NUMBER OF STEPS/HOUR |
| 200 MILLION | 1 BILLION | 0% | 10% | 419.9 BILLION | 1.44 TRILLION |

F I G. 1 8

PACKET PROCESSING APPARATUS, PACKET PROCESSING METHOD, AND PACKET PROCESSING SYSTEM

CROSS-REFERENCE TO RELATED APPLICATION

This application is based upon and claims the benefit of priority of the prior Japanese Patent Application No. 2013-230518, filed on Nov. 6, 2013, the entire contents of which are incorporated herein by reference.

FIELD

The embodiments discussed herein are related to processing a plurality of packets each with a different priority.

BACKGROUND

The spread of communication apparatuses has diversified the types of packets transmitted and received within a network and the lengths of data included in packets. In addition, packets each with a different priority have often been transmitted and received within the same network. When a plurality of packets each with a different priority are transmitted or received within a network, it is sometimes desirable to maintain a delay caused by a communication process performed for a packet with a high priority within a predetermined range. Accordingly, a technique has been proposed wherein, before a communication starts, a bandwidth to be used for the communication is reserved, and the communication is performed using the reserved bandwidth to prevent a processing delay from varying.

In a related art, a signal processing system is proposed wherein a guaranteed processing quantity is determined for each of the priorities of processing-object signals, which are processed in order of the priorities thereof and in the order of arrival under a condition in which the guaranteed processing quantities are upper limits, thereby enabling signals causing a large load and having a low priority to be processed. A node device has also been proposed that includes a plurality of transfer processing units and, in accordance with auxiliary information associated with information extracted from a received packet, selects a transfer processing unit for processing the received packet. The node device holds a processing management table that associates auxiliary information with the processing content of a received packet. The processing management table reflects the result of processing performed by a transfer processing unit and the load situation of the transfer processing unit. In addition, an apparatus has also been proposed wherein the amount of characteristic including features of reception data is extracted, a processing capacity required for a communication task is estimated using the amount of characteristic, and the processing capacity is adjusted using a difference between the estimated processing capacity and the processing capacity assigned to the communication task.

For example, Japanese Laid-open Patent Publication Nos. 1-209839, 2002-354009, and 2009-253520 are known.

Even in the case of performing a communication using a reserved bandwidth, when a software-based process is performed on a packet, such a process could cause a delay that is greater than a predicted delay. Hence, even when a communication band is reserved, depending on the processing capacity of a processing apparatus, it could have been difficult to maintain a delay time within a predetermined range.

Even in the case of using any of the methods described above as related arts, it is difficult to maintain a delay time within a predetermined range when the processing delay includes a delay caused by a software-based process performed on a packet.

SUMMARY

According to an aspect of the embodiments, a packet processing apparatus includes a receiver, a processing circuit, a first cache, and a second cache. The receiver receives packets. The processing circuit processes the packets. The first cache stores preferential packets to be preferentially processed by the processing circuit. The second cache stores packets other than the packets stored in the first cache. The processing circuit adjusts the number of preferential packets stored in the first cache in a manner such that the preferential packets are processed at the amount of processing that is equal to or less than a set value set as the amount of processing applicable to the preferential packets within a predetermined period. The processing circuit processes the packets stored in the first cache. In addition, the processing circuit reads from the second cache as many packets as are processable at a surplus value, and processes the read packets, the surplus value being obtained by subtracting the amount of processing to be applied to the preferential packets stored in the first cache from the amount of processing that the processing circuit is capable of performing within the predetermined period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates exemplary packet characteristic tables;

FIG. 5 illustrates exemplary parameter information tables;

FIG. 6 illustrates an exemplary packet format;

FIG. 7 is a flowchart illustrating an exemplary method for packet classification;

FIG. 8 illustrates an exemplary correction table;

FIG. 9 illustrates an exemplary reservation table;

FIG. 10A is a flowchart illustrating an exemplary process performed in queuing packets;

FIG. 12 illustrates an example of a reservation information table for use in a second embodiment;

FIG. 13 illustrates an example of a reservation information table for use in the second embodiment;

FIG. 14 illustrates an example of a reservation information table for use in the second embodiment;

FIG. 15 illustrates an example of a reservation information table for use in the second embodiment;

FIG. 16 illustrates an example of a reservation information table for use in the second embodiment;

FIG. 17 illustrates an example of a reservation information table for use in the second embodiment;

FIG. 18 illustrates an example of a reservation information table for use in the second embodiment;

DESCRIPTION OF EMBODIMENTS

Figure 1:
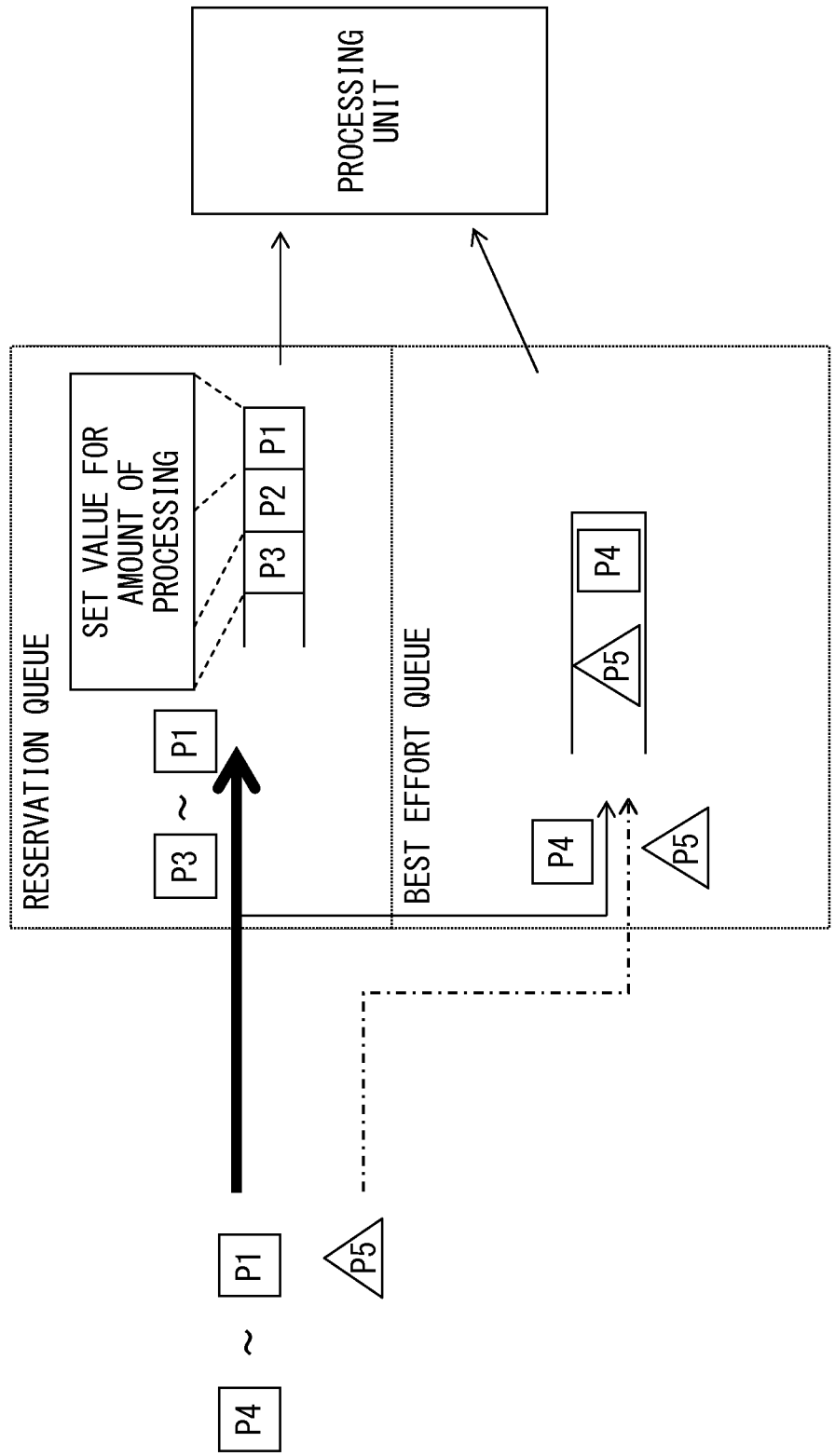
FIG. 1 illustrates an example of a processing method in accordance with an embodiment.

FIG. 1 illustrates an example of a processing method in accordance with an embodiment. A processing apparatus includes a reservation queue, a best effort queue, and a processing unit. The reservation queue is used to store packets to be preferentially processed by the processing apparatus. A packet to be preferentially used may hereinafter be referred to as a "preferential packet". Meanwhile, the best effort queue stores the preferential packets that are not stored in the reservation queue as well as packets other than preferential packets (normal packets).

The processing apparatus sets in advance the amount of processing (set value for the amount of processing) that the processing apparatus is capable of applying to the packets stored in the reservation queue within a predetermined period. Upon receipt of a packet, the processing apparatus determines whether the received packet is a preferential packet. Arbitrary information depending on an implementation, such as the type of the packet or the combination of the source and destination of the packet, is used to determine whether the packet is a preferential packet. In receiving a preferential packet, the processing apparatus stores the newly received preferential packet in the reservation queue when the sum of the amount of processing to be applied to the packets stored in the reservation queue and the amount of processing to be applied to the newly received preferential packet does not exceed the set value.

In the example of FIG. 1, the processing apparatus has received packets P1-P5 . Assume that the packets P1-P4 are preferential packets and the packet P5 is a normal packet. First, the processing apparatus receives the packet P1 , determines that the packet P1 is a preferential packet, and estimates the amount of processing to be applied to the packet P1. In the example of FIG. 1, the amount of processing applied to the packet P1 is less than the set value, and another packet is not stored in the reservation queue. Hence, the processing apparatus stores the packet P1 in the reservation queue. Upon receipt of the packet P2, the processing apparatus performs the determining process, as in the case of the packet P1. In addition, the processing apparatus compares the sum of the amount of processing to be applied to the packet P2 and the amount of processing to be applied to the packet P1 with the set value. In the example of FIG. 1, since the sum of the amounts of processing to be applied to the packets P1 and P2 is less than the set value, the packet P2 is also stored in the reservation queue. Through a process similar to the process for the packet P2, the packet P3 is also stored in the reservation queue.

Then, the processing apparatus receives the packet P4. As the packet P4 is a preferential packet, the processing apparatus compares the set value with the total value of the amount of processing to be applied to the packet P4 and the amounts of processing to be applied to the packets P1-P3, i.e., the packets stored in the reservation queue. Assume that the total value of the amounts of processing to be applied to the packets P1-P4 is greater than the set value. The processing apparatus determines that, although the packet P4 is a preferential packet, the packet P4 cannot be stored in the reservation queue, and stores this packet in the best effort queue. Further assume that the processing apparatus has received the packet P5. Since the packet P5 is a normal packet, the processing apparatus stores the packet P5 in the best effort queue.

Subsequently, the processing unit processes the packets stored in the reservation queue and then processes the packets stored in the best effort queue. The processing unit processes the packets input from the reservation queue by using as many resources as are indicated by the set value determined in advance. In other words, processing to be performed using resources secured under the set value is reserved for the packets stored in the reservation queue. Hence, processing of the preferential packets stored in the reservation queue is finished within a predetermined period determined in advance. The processing unit processes the packets obtained from the best effort queue using the difference between the amount of the processing that can be performed within the predetermined period and the amount of processing to be applied to the packets obtained from the reservation queue.

As described above, packets to be processed within a predetermined period by the processing apparatus are selected using the amount of processing to be applied to each packet and the amount of processing that can be preferentially performed within a predetermined period. The packets stored in the reservation queue are processed within a predetermined period so that a processing delay time can be correctly estimated. Therefore, designing the processing apparatus to set a large amount of processing to be applied to packets stored in the reservation queue allows all preferential packets to be stored in the reservation queue, with the result that a delay in processing the preferential packets can be correctly estimated.

<Apparatus Configuration>

Figure 2:
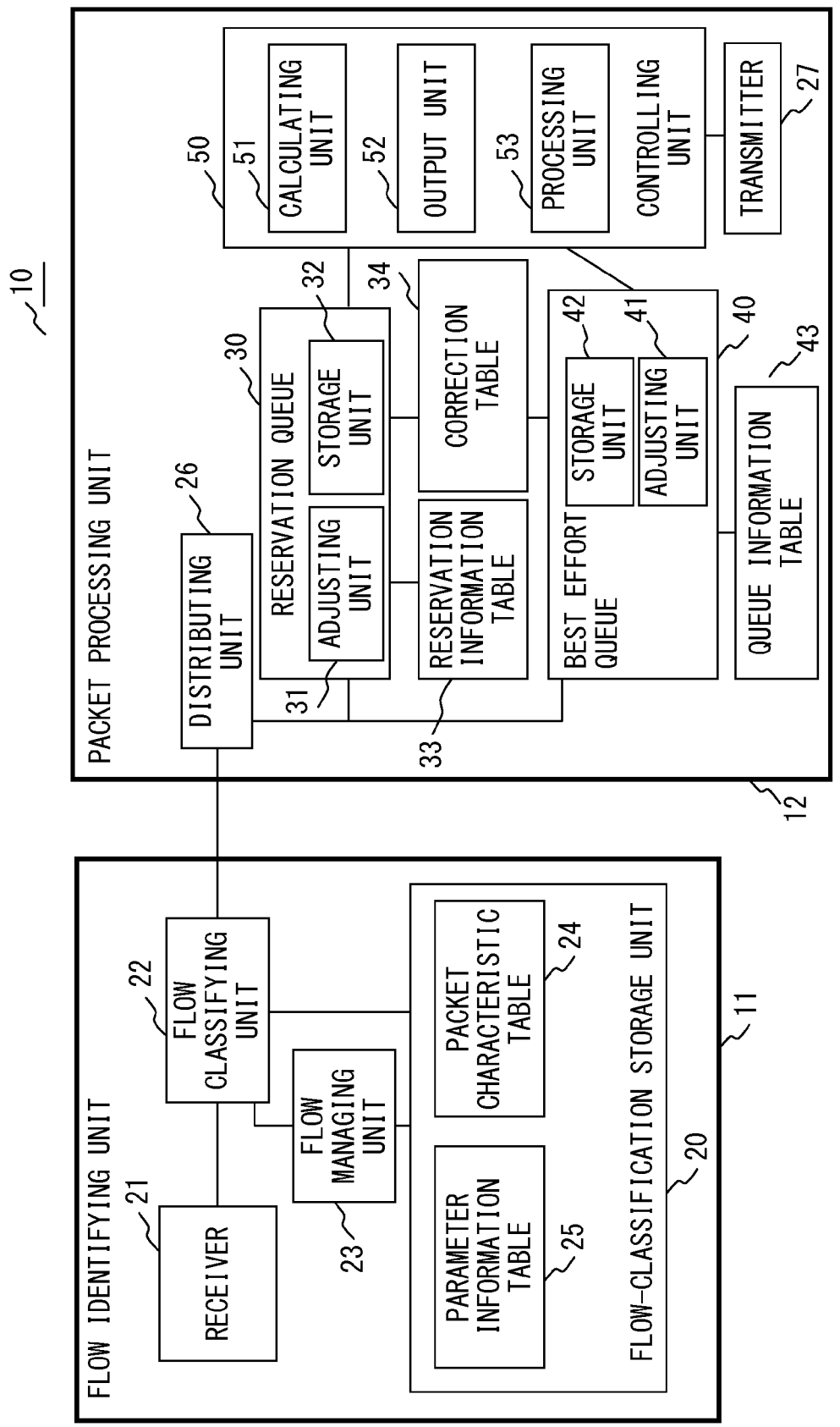
FIG. 2 illustrates an exemplary configuration of a processing apparatus.

FIG. 2 illustrates an exemplary configuration of a processing apparatus 10. In the example depicted in FIG. 2, the processing apparatus 10 includes a flow identifying unit 11 and a packet processing unit 12. The flow identifying unit 11 includes a receiver 21, a flow classifying unit 22, a flow managing unit 23, and a flow-classification storage unit 20. The flow-classification storage unit 20 stores a packet characteristic table 24 and a parameter information table 25. The packet processing unit 12 includes a distributing unit 26, a reservation queue 30, a reservation information table 33, a correction table 34, a best effort queue 40, a queue information table 43, and a controlling unit 50. The reservation queue 30 includes an adjusting unit 31 and a storage unit 32. The best effort queue 40 includes an adjusting unit 41 and a storage unit 42. The controlling unit 50 includes a calculating unit 51, an output unit 52, and a processing unit 53. A transmitter 27 is an optional element. In the case where the processing apparatus 10 is an apparatus used to relay packets or where packets processed by the processing unit 53 are transmitted to another apparatus, the processing apparatus 10 includes the transmitter 27.

The receiver 21 receives packets from, for example, another apparatus over a network. The receiver 21 outputs received packets to the flow classifying unit 22. The flow classifying unit 22 distinguishes control packets for setting packets to be processed using the reservation queue 30 and data packets received from a user from each other using type information included in the packets. The flow classifying unit 22 outputs input control packets to the flow managing unit 23. Using the control packets, the flow managing unit 23 manages information stored in the packet characteristic table 24 and the parameter information table 25.

When a data packet is received, the flow classifying unit 22 refers to the packet characteristic table 24 and the parameter information table 25 so as to determine whether the packet input from the receiver 21 is a preferential packet. Descriptions will hereinafter be given of the parameter information table 25, an example of the packet characteristic table 24, and an exemplary method for determining a preferential packet. The flow classifying unit 22 outputs a received packet to the distributing unit 26 together with information indicating whether the received packet is a preferential packet. The distributing unit 26 outputs a packet judged to be a preferential packet to the adjusting unit 31. In addition, the distributing unit 26 outputs a normal packet to the adjusting unit 41.

Using the correction table 34 as appropriate, the adjusting unit 31 calculates the amount of processing to be applied to an input packet. In addition, the adjusting unit 31 calculates the sum of the amount of processing to be applied to the packets already stored in the storage unit 32 and the amount of processing to be applied to the newly input packet. The adjusting unit 31 compares the obtained sum with a set value provided for the amount of processing allocated to the packets stored in the reservation queue 30. In this case, the adjusting unit 31 uses the reservation information table 33 as appropriate. When the sum is equal to or lower than the set value, the adjusting unit 31 stores the input packet in the storage unit 32. Meanwhile, when the sum is higher than the set value, the adjusting unit 31 outputs the input packet to the adjusting unit 41. Descriptions will hereinafter be given of examples of the reservation information table 33 and the correction table 34 and a specific example of the operation of the adjusting unit 31.

Using the correction table 34 as appropriate, the adjusting unit 41 calculates the amount of processing to be applied to an input packet. In addition, the adjusting unit 41 calculates the sum of the amount of processing to be applied to the packets stored in the storage unit 42 and the amount of processing to be applied to the packet newly input from the adjusting unit 31 or the distributing unit 26. Using the sum, the adjusting unit 41 determines whether the newly input packet can be stored in the storage unit 42. In this case, the storage unit 42 stores a packet that can be processed at the amount of processing obtained by subtracting the set value set for the packets stored in the reservation queue 30 from the total amount of processing that the processing unit 53 performs within a predetermined period. In this case, the adjusting unit 41 uses the queue information table 43 as appropriate. Descriptions will also be given hereinafter of an example of the queue information table 43 and a specific example of the operation of the adjusting unit 41.

The best effort queue 40 may be configured in a manner such that as many packets as correspond to the capacity of the storage unit 42 may be stored in the storage unit 42 without calculating or adjusting the amount of processing to be applied to the packets. In this case, the processing apparatus 10 may not include the adjusting unit 41.

The calculating unit 51 calculates the amount of processing to be applied to the packets stored in the storage unit 32. The calculating unit 51 outputs the obtained calculation result to the output unit 52. The output unit 52 outputs packets stored in the storage unit 32 to the processing unit 53. In addition, the output unit 52 calculates a surplus value obtained by subtracting a calculated value obtained by the calculating unit 51 from the total amount of processing that the processing unit 53 performs within a predetermined period. Moreover, the output unit 52 reads as many packets as can be processed at the surplus value from the storage unit 42 and outputs the packets to the processing unit 53. The processing unit 53 processes the packets obtained from the output unit 52. Accordingly, the processing unit 53 processes packets that were stored in the storage unit 32, and, using the surplus processing capacity after the packets that were stored in the storage unit 32 have been processed, the processing unit 53 processes packets that were stored in the storage unit 42.

Figure 3:
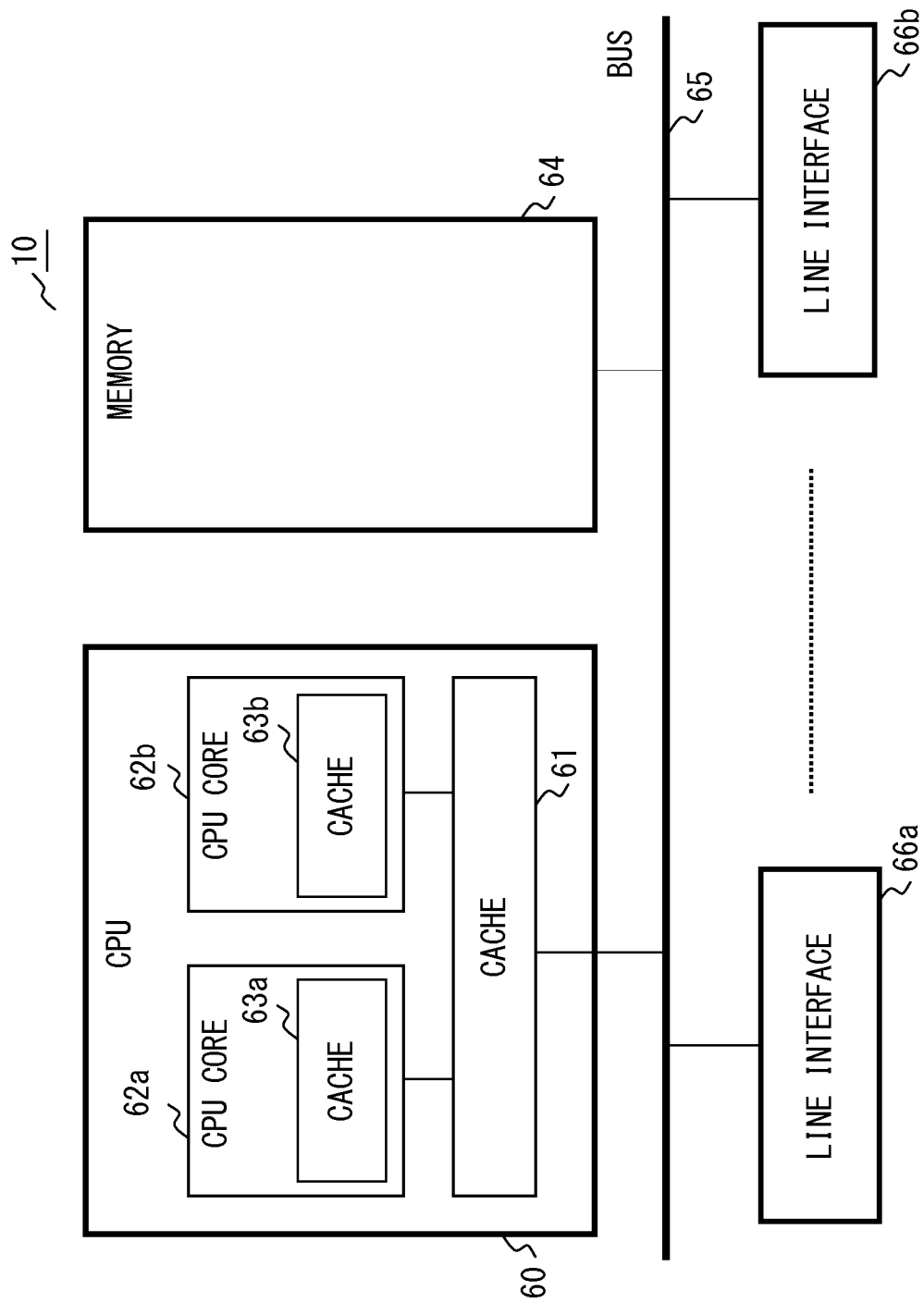
FIG. 3 illustrates an exemplary hardware configuration of a processing apparatus.

FIG. 3 illustrates an exemplary hardware configuration of the processing apparatus 10. The processing apparatus 10 includes a Central Processing Unit (CPU) 60, a cache 61, CPU cores 62 (62a, 62b), caches 63 (63a, 63b), a memory 64, a bus 65, and line interfaces 66 (66a, 66b). For example, the processing apparatus 10 may be achieved by a computer. FIG. 3 depicts an example in which the processing apparatus 10 includes the CPU 60, but the processing apparatus 10 may include a processor that is different from the CPU 60.

The CPU cores 62 are processing circuits and are operated as the flow classifying unit 22, the flow managing unit 23, the distributing unit 26, the adjusting unit 31, the adjusting unit 41, and the controlling unit 50. The cache 61, the caches 63, and the memory 64 are operated as the flow-classification storage unit 20, the storage unit 32, and the storage unit 42, and, in addition, store information such as the reservation information table 33, the correction table 34, and the queue information table 43. A program and data used for the operation of the CPU 60 are stored in the memory 64 and are loaded into the cache 61 or the caches 63 as appropriate. To preferentially process the packets stored in the reservation queue 30, the caches 63 and the cache 61 are allocated to the adjusting unit 31 more preferentially than the adjusting unit 41. The bus 65 connects the CPU 60, the memory 64, and the line interfaces 66 so that data can be exchanged therebetween. The line interfaces 66 are operated as the receiver 21 and the transmitter 27.

The CPU cores 62, both used to process the packets stored in the storage unit 32 and the storage unit 42, may be identical with each other or may be different from each other. For example, the CPU core 62a may be used to process the packets stored in the storage unit 32, and the CPU core 62b may be used to process both the packets stored in the storage unit 32 and the packets stored in the storage unit 42.

FIG. 3 illustrates an example in which two CPU cores 62 are provided, but one CPU 60 may include any number of CPU cores 62. When, for example, the CPU 60 includes four CPU cores 62, CPU cores 62a-62c may be preferentially used to process packets that were stored in the storage unit 32, and a CPU core 62d may be used to process packets that were stored in the storage unit 42.

<First Embodiment>

The following will describe a first embodiment with reference to the setting of reservation on the processing apparatus 10, the classifying of received packets, the queueing of packets, and the processing of packets.

[Setting of Reservation on Processing Apparatus]

At a request from a user, an operator transmits, to the processing apparatus 10, a control packet for reporting an object to be processed using the reservation queue 30. When the type of the received packet, which has been obtained via the receiver 21, is a control packet, the flow classifying unit 22 determines that the received packet is a control packet, and outputs the control packet to the flow managing unit 23.

The type may be set using, for example, a type field included in an IP header. The following will describe the updating of the packet characteristic table 24 and the parameter information table 25 performed by the flow managing unit 23.

FIG. 4 illustrates examples of the packet characteristic table 24. The packet characteristic table 24 has recorded therein a method for classifying flows transmitted via the processing apparatus 10. For each flow, the packet characteristic table 24 depicted in FIG. 4 has recorded therein information such as a flow identification number, a source IP address, a destination IP address, a protocol, a source port number, and a destination port number. In addition, in the example of FIG. 4, the value of the Security Parameter Index (SPI) of Security Architecture for Internet Protocol (IPsec) is recorded for each flow. Flow identification numbers are identifiers used to identify individual flows. Information on a protocol used by a flow identified using a flow identifier, e.g., IPsec, Transmission Control Protocol (TCP), and User Datagram Protocol (UDP), is recorded in the field "protocol" included in the packet characteristic table 24. IPsec SPI is a value used to specify a parameter used in the encoding or decoding of a packet. In the initial state, a setting related to a process to be performed using the reservation queue 30 is not included, and hence arbitrary packets that the processing apparatus 10 may possibly receive are associated with flow identification number=0, as depicted in a packet characteristic table 24a.

Upon receipt of a control packet, the flow managing unit 23 calculates the sum of the following two values: a predicted value of the number of steps needed to process a designated number of packets of a flow designated by the control packet; and the value of the number of process steps to be performed within a predetermined period for a flow for which a process to be performed via the reservation queue 30 has been reserved. In addition, the flow managing unit 23 compares the obtained sum with the number of steps that can be performed within a predetermined period in a process performed using the reservation queue 30. The predetermined period is a time unit used to manage the number of steps within the reservation information table 33, and is set to an arbitrary length that depends on an application, e.g., one microsecond, one millisecond, or one second. When the sum exceeds the number of steps that can be performed within a predetermined period in a process performed using the reservation queue 30, the flow managing unit 23 determines that a packet of the new flow cannot be stored in the reservation queue 30, discards the control packet, and reports an error to the source of the control packet.

Meanwhile, when the sum is equal to or less than the number of steps that can be performed within a predetermined period in a process performed using the reservation queue 30, the flow managing unit 23 determines that a new flow can be reserved. Assume, for example, that two million steps can be processed per second for packets from the reservation queue 30 and that a reservation has not been included for a process for another flow, as depicted in the packet characteristic table 24a. Further assume that the number of steps associated with the type of packets processed by the user is 2000 per packet and that 1000 packets are processed per second at a processing speed demanded by the user. Accordingly, the sum is the number of process steps for the flow designated by the control packet plus the number of process steps for a flow for which a reservation has been made, i.e., the sum is 2000 steps×100 packets+0 step=200 thousands steps. Hence, the flow managing unit 23 determines that a reservation related to the flow reported by the control packet can be set.

When the flow managing unit 23 determines that a reservation related to the flow reported by the control packet can be set, the flow managing unit 23 registers, in the packet characteristic table 24, an information element registered in the packet characteristic table 24 from among information included in the control packet. In the case of the flow designated by the control packet, the source IP address is 10.0.0.1, the destination IP address is 10.0.0.2, and the value of IPsecSPI is 1001. Accordingly, the flow managing unit 23 adds "flow identification number=1", i.e., an entry indicated in a packet characteristic table 24b, to the packet characteristic table 24a. In addition, the flow managing unit 23 updates the parameter information table 25.

FIG. 5 illustrates examples of the parameter information table 25. The parameter information table 25 has recorded therein a reservation status, a process type, the expected number of process steps, and the amount of access memory in association with a flow identification number. The reservation status indicates whether a packet is to be preferentially stored in the reservation queue 30. For a flow for which a reservation has been made to preferentially perform a process via the reservation queue 30, the reservation status is set to "reserved". Meanwhile, for a flow for which a reservation has not been made to preferentially perform a process via the reservation queue 30, the reservation status is set to "best effort". That is, for a preferential packet, the reservation status is set to "reserved"; for a normal packet, the reservation status is set to "best effort".

In association with a flow identification number used for an entry generated in the packet characteristic table 24, the flow managing unit 23 registers the type of a process specified by a control packet in the parameter information table 25. In addition, in accordance with the type of the specified process, the flow managing unit 23 registers, in the parameter information table 25, the number of process steps to be used to process one packet and the amount of access memory to be used to process one packet. For each packet type, the flow managing unit 23 stores possible set values that indicate the number of process steps to be used to process one packet and indicate the amount of access memory to be used to process one packet. The expected number of process steps recorded in the parameter information table 25 is a value used in accordance with a packet type as a predicted value of the number of steps needed to process one packet. Depending on the packet type, the number of process steps may vary in accordance with a packet length, but the parameter information table 25 has stored therein a predetermined value regardless of the packet length to facilitate allocation of packets. Similarly, regardless of a packet length, a predetermined value that depends on a packet type is set as the amount of access memory. Note that the amount of access memory is the amount of memory used to process one packet.

The following will describe a specific example of a change in the parameter information table 25. Assume that a control packet includes information indicating that a request has been made to perform IPsec-based encoding of a flow designated by the control packet. Accordingly, for a flow with flow identification number=1, the flow managing unit 23 registers, in the parameter information table 25, information indicating that use of the reservation queue 30 has been reserved and that the process type is IPsec encoding. When the expected number of process steps is 2000 per packet and the amount of memory predicted to be used to process one packet is 1024 bytes, the flow managing unit 23 adds information to that effect to the entry with flow identification number=1 of the parameter information table 25b. Further assume that a next control packet reports the following information.
   Source IP address: 10.0.0.2
   Destination IP address: 10.0.0.1
   Protocol: IPsec
   IPsecSPI: 1001
   Process: IPsec decoding
Accordingly, the flow managing unit 23 performs a similar process to add the entries of "flow identification number=2" indicated in the packet characteristic table 24b to the packet characteristic table 24. Meanwhile, the entries of "flow identification number=2" indicated in the parameter information table 25b are added to the parameter information table 25. (In this example, equivalent numbers of steps are assumed for IPsec encoding and IPsec decoding.)

<Classification of Packets>

The following will describe a method for classifying a flow with reference to an exemplary situation in which the processing apparatus 10 holds the packet characteristic table 24b and the parameter information table 25b.

The receiver 21 outputs a received packet to the flow classifying unit 22. When the received packet is a data packet, to determine which flow has been used to transmit the data packet, the flow classifying unit 22 extracts, from the received packet, information registered in the packet characteristic table 24 and used to classify the flow. Information registered in the packet characteristic table 24 and used to classify a flow may hereinafter be referred to as "flow attribute information". Flow attribute information may be, for example, a source IP address, a destination IP address, a source port number, or a destination port number. The flow classifying unit 22 extracts flow attribute information from the IP header of a received packet or the header of a transport layer. In addition, the flow classifying unit 22 searches the packet characteristic table 24 using flow attribute information as a key and specifies a flow identification number for identifying a flow that includes the received packet.

Let 10.0.0.1 be the source IP address of the received packet; 10.0.0.2, the destination IP address; 1001, IPsecSPI. In this case, using the information, the flow classifying unit 22 searches the packet characteristic table 24 and determines that the conditions of the received packet conform to the entries of flow identification number=1. When the conditions of the received packet correspond to conditions of a plurality of entries, the flow classifying unit 22 defines, as information on the flow to which the received packet belongs, information on an entry having the largest number of information elements that completely conform to the conditions of the received packet. As an example, a packet corresponding to flow identification number=1 also satisfies the conditions of flow identification number=0, but flow identification number=1 has a larger number of information elements that completely conform to conditions of the received packet, e.g., source IP address and destination IP address. Accordingly, even when the present packet corresponds to both flow identification number=1 and flow identification number=0, the flow classifying unit 22 determines that the packet belongs to the flow with flow identification number=1.

Next, using the specified flow identification number, the flow classifying unit 22 refers to the parameter information table 25b. In one possible example, using the parameter information table 25b, the flow classifying unit 22 determines that use of the reservation queue 30 has been reserved for the flow with flow identification number=1 and that the flow is to be subjected to IPsec encoding. In addition, the flow classifying unit 22 determines that the expected number of process steps is 2000 per packet and that the amount of access memory is 1024 bytes per packet. The information determined by the flow classifying unit 22 using the packet characteristic table 24 and the parameter information table 25 may hereinafter be referred to as "additional information". The flow classifying unit 22 associates additional information with a received packet and outputs the information to the distributing unit 26.

FIG. 6 illustrates an exemplary packet format. For example, the flow classifying unit 22 may generate a packet common-management header for each packet and output the header to the distributing unit 26, as indicated by P1 in FIG. 6. The packet common-management header includes a pointer indicating the beginning address of memory region of the processing apparatus 10 in which a received packet is stored, and a pointer indicating the beginning address of memory region in which additional information is stored. The additional information includes a reservation status, a process type, the expected number of process steps, and the amount of access memory.

D1 in FIG. 6 indicates exemplary set values stored in the field "process type". The set values stored in the field "process type" are values for uniquely identifying process types. In the example of D1, the process types include L3 relay, L2 relay, Network Address Translation (NAT), encapsulation and decapsulation for communication based on Generic Routing Encapsulation (GRE) tunnel, and encoding and decoding based on IPsec. In the example of D1, values 0-6 are set for the process types. D2 in FIG. 6 indicates exemplary values for specifying reservation statuses. In the example of D2, set value 0 is set for a flow for which the parameter information table 25 has recorded therein information indicating that a process to be performed via the reservation queue 30 has been reserved. Meanwhile, set value 1 is set for a flow for which a process performed via the reservation queue 30 has not been reserved and which includes only packets to which a process based on a best-effort scheme is to be applied.

FIG. 7 is a flowchart illustrating an exemplary method for packet classification. FIG. 6 depicts an example in which additional information is stored in a region that is different from a region where a packet is stored, but additional information may be attached to a packet. With reference to FIG. 7, the following will describe a process performed under a condition in which additional information is attached to a packet.

The receiver 21 outputs a data packet to the flow classifying unit 22 (step S1). The flow classifying unit 22 extracts flow attribute information from the input packet and searches the packet characteristic table 24 using the obtained information as a key (step S2). The flow classifying unit 22 determines whether the parameter information table 25 includes an entry that matches a flow specified using the attribute information (step S3). When the parameter information table 25 includes an entry that matches the flow, the flow classifying unit 22 attaches additional information to the packet in accordance with the entry (Yes in step S3; step S4). The flow classifying unit 22 outputs to the packet processing unit 12 the packet to which additional information has been attached (step S5). Meanwhile, when the parameter information table 25 does not include an entry that matches attribute information, the flow classifying unit 22 determines that an invalid packet has been input, and discards the packet (step S6).

<Queueing of Packet>

(1) Queueing of packets in reservation queue 30

The distributing unit 26 reads additional information and outputs, to the adjusting unit 31, a packet for which a process to be performed via the reservation queue 30 has been reserved. In addition, the distributing unit 26 outputs, to the adjusting unit 41, a packet for which a process to be performed via the reservation queue 30 has not been reserved.

The adjusting unit 31 specifies the type of the input packet and determines whether the number of steps of the process to be performed on the input packet changes with a variable parameter such as a packet length. Examples of processes for which the number of steps changes with, for example, a packet length include IPsec-based encoding and decoding, packet compression, and packet decompression. When the adjusting unit 31 determines that the number of steps of the process changes with, for example, a packet length, the adjusting unit 31 refers to the correction table 34 to calculate the number of steps needed for the process.

FIG. 8 illustrates an example of the correction table 34. The correction table 34 in FIG. 8 has recorded therein a correction formula for the number of steps for packets to be encoded or decoded under IPsec, and a correction formula for the number of process steps for packets to be compressed or decompressed. The correction formula may be expressed as, for example, the number of process steps of additional information plus the product of the number of steps of a process per byte of an IP data portion of a packet to be processed and the number of bytes of IP data. In FIG. 8, A indicates the number of process steps of additional information.

In one possible example, packets with flow identification number=1 are subjected to IPsec-based encoding. Accordingly, when packets with flow identification number=1 are input, the adjusting unit 31 calculates the number of process steps using the formula stored in a first entry in FIG. 8. Assume that the length of IP data included in the packet with flow identification number=1 is 256 bytes and that the number of process steps of additional information (A) is 3000. In this case, the number of steps needed to process the packets with flow identification number=1 is as follows:

$$A + data\ length \times 10 = 3000 + 256 \times 10 = 5560$$

After calculating the number of steps needed to process the packets, the adjusting unit 31 refers to the reservation information table 33 to determine whether the packets can be stored in the storage unit 32.

FIG. 9 illustrates examples of the reservation information table 33. A reservation information table 33a indicates an example in which the length of a predetermined period that is the minimum unit of processing is one second. The reservation information table 33a includes "number of allocated steps", "cumulative-total number of consumed steps", "number of surplus steps", "amount of allocated access memory", "amount of consumed memory", and "amount of surplus memory". "number of allocated steps" indicates the number of steps that the processing unit 53 can process in one second for packets stored in the reservation queue 30. "cumulative-total number of consumed steps" indicates the total number of steps used to process packets that are to be processed at or after the start time of a predetermined period and that are already stored in the storage unit 32. "number of surplus steps" indicates a value obtained by subtracting the cumulative-total number of consumed steps from the number of allocated steps. "amount of allocated access memory" indicates the maximum amount of memory that the processing unit 53 can use to process packets stored in the reservation queue 30. "amount of consumed memory" indicates the amount of memory used by the processing unit 53 in the processing of the packets stored in the reservation queue 30. "amount of surplus memory" indicates a value obtained by subtracting the amount of consumed memory from the amount of allocated access memory. The following description is based on the assumption that, at the moment when packets with flow identification number=1 are input to the adjusting unit 31, the processing apparatus 10 holds the reservation information table 33a.

The adjusting unit 31 compares the number of steps calculated using the correction table 34 with the number of surplus steps stored in the reservation information table 33a. In this example, the number of steps calculated by the adjusting unit 31 is 5560. Hence, since the number of steps calculated using the correction table 34 is smaller than the number of surplus steps, the adjusting unit 31 determines that packets can be stored in the storage unit 32 when memory to be used to process the packets is secured. Accordingly, the adjusting unit 31 compares the amount of access memory included in additional information with the amount of surplus memory stored in the reservation information table 33a. The amount of access memory is 1024 bytes as depicted in FIG. 6, while the amount of surplus memory in the reservation information table 33a is 2000000 bytes, indicating that the amount of surplus memory is larger than the amount of access memory. Accordingly, the adjusting unit 31 determines that packets can be stored in the storage unit 32, and outputs the packets to the storage unit 32. In addition, the adjusting unit 31 updates the reservation information table 33a to the reservation information table 33b.

Meanwhile, when surplus steps or surplus memory runs short, the adjusting unit 31 outputs the packets to the adjusting unit 41. Note that, when the adjusting unit 31 corrects the number of process steps for packets to be output to the adjusting unit 41, the adjusting unit 31 outputs the corrected number to the adjusting unit 41.

When a predetermined processing period elapses since the start of calculation of the cumulative-total number of consumed steps, the adjusting unit 31 resets the cumulative-total number of consumed steps, i.e., sets the number to 0, so as to determine whether the packets can be processed during the next processing period. Setting the cumulative-total number of consumed steps to 0 makes the number of surplus steps equal to the number of allocated steps.

(2) Queueing of Packets in Best Effort Queue 40

For both packets input from the adjusting unit 31 and packets input from the distributing unit 26, the adjusting unit 41 makes a determination as to whether the packets can be stored in the storage unit 42. A method used by the adjusting unit 41 to calculate the number of steps needed to process packets is similar to the method used by the adjusting unit 31. In determining whether packets can be stored in the storage unit 42, the adjusting unit 41 uses the queue information table 43. Information elements included in the queue information table 43 are similar to those included in the reservation information table 33, and values included in the queue information table 43 include, for example, the number of steps that the processing unit 53 can perform to process packets stored in the storage unit 42 during a predetermined processing period. Using the queue information table 43, the adjusting unit 41 makes a determination similar to the determination made by the adjusting unit 31. When the number of steps has been calculated for the packets input from the adjusting unit 31, the adjusting unit 41 makes the determination using the calculated value obtained from the adjusting unit 31. When the adjusting unit 41 determines that as many steps as are needed to process the packets and memory for processing the packets can be provided, the adjusting unit 41 stores the packets in the storage unit 42. Meanwhile, when the adjusting unit 41 determines that as many steps as are needed to process the packets and memory for processing the packets cannot be secured, the adjusting unit 41 discards the packets.

Figure 10B:
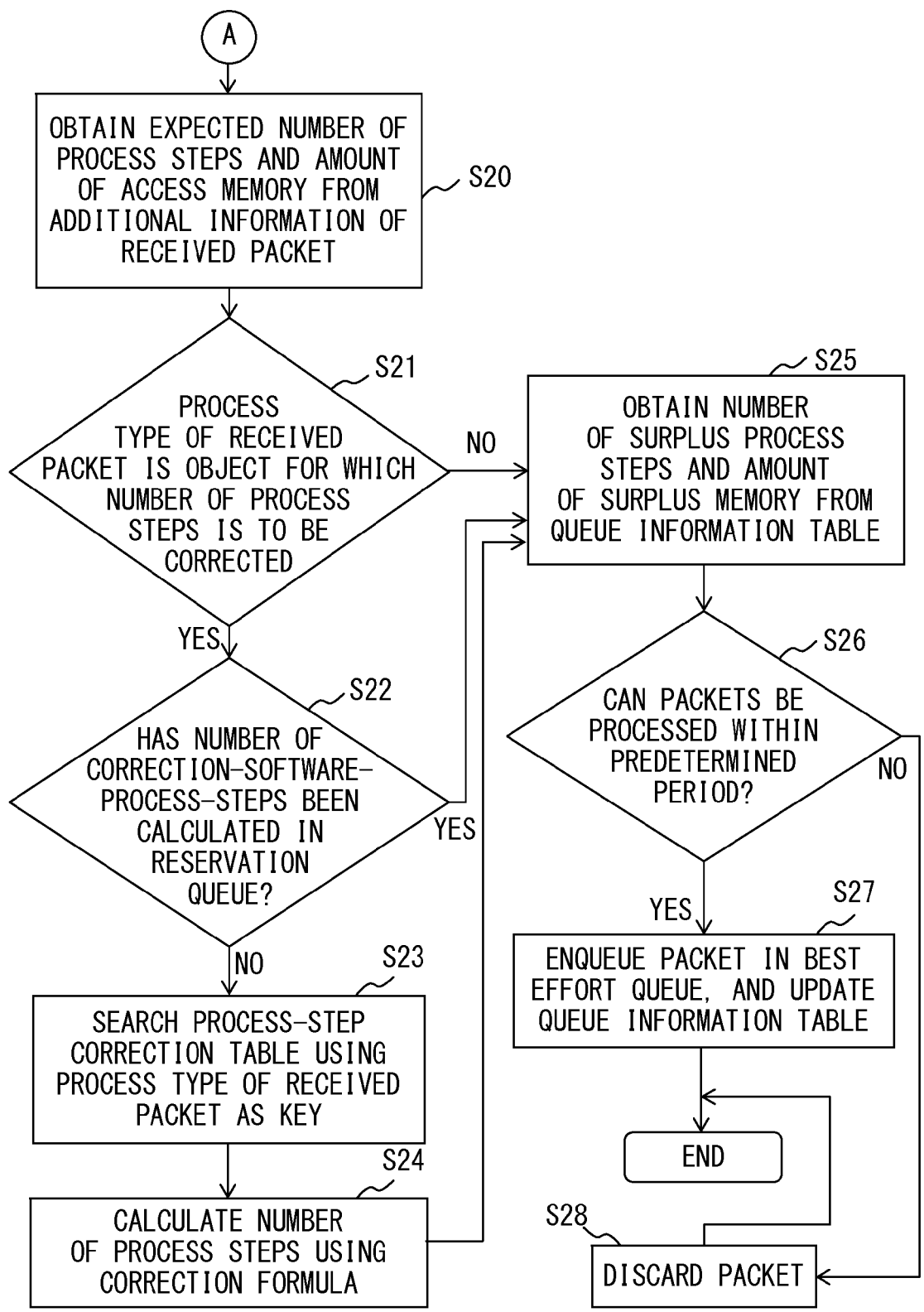
FIG. 10B is a flowchart illustrating an exemplary process performed in queuing packets.

FIGS. 10A and 10B are flowcharts illustrating an exemplary process performed in queueing packets. The distributing unit 26 obtains a packet from the flow classifying unit 22 (step S11). The distributing unit 26 determines whether the reservation status included in additional information of the packet is "reserved" (step S12). When the reservation status included in additional information of the packet is "reserved", the distributing unit 26 outputs the packet to the adjusting unit 31 (Yes in step S12). The adjusting unit 31 obtains the expected number of process steps and the amount of access memory from additional information of the packet (step S13). The adjusting unit 31 determines whether the process type of the packet is an object for which the number of process steps is to be corrected (step S14). When the process type is an object for which the number of process steps is to be corrected, the adjusting unit 31 obtains from the correction table 34 a correction formula to be applied to the input packet (Yes in step S14; step S15). The adjusting unit 31 calculates the number of process steps using the obtained correction formula (step S16). In addition, the adjusting unit 31 obtains the number of surplus steps and the amount of surplus memory from the reservation information table 33 (step S17). In accordance with a result of comparison between the number of surplus steps and the number of steps to be used to process the packet and a result of comparison between the amount of surplus memory and the amount of access memory, the adjusting unit 31 determines whether the packet can be processed within a predetermined period (step S18). When the packet can be processed within a predetermined period, the adjusting unit 31 stores the packet in the storage unit 32 of the reservation queue 30 and updates the reservation information table 33 (Yes in step S18; step S19).

Meanwhile, when, in step S14, the process type is judged to not be an object for which the number of process steps is to be corrected, the adjusting unit 31 obtains the number of surplus steps and the amount of surplus memory from the reservation information table 33 (No in step S14; step S17). Then, the processes of step S18 and the following steps are performed.

When it is determined in step S12 that the reservation status stored in the additional information of the packet is not "reserved" or when it is determined in step S18 that the packet cannot be processed within a predetermined period, the adjusting unit 31 outputs the packet to the adjusting unit 41. The adjusting unit 41 obtains the expected number of process steps and the amount of access memory from the additional information of the packet (step S20). The adjusting unit 41 determines whether the process type of the packet is an object for which the number of process steps is to be corrected (step S21). When the process type of the packet is an object for which the number of process steps is to be corrected, the adjusting unit 41 determines whether the adjusting unit 31 of the reservation queue 30 has corrected the number of steps (Yes in step S21; step S22).

When the adjusting unit 31 of the reservation queue 30 has not corrected the number of steps, the adjusting unit 41 obtains a correction formula to be applied to the input packet from the correction table 34 (No in step S22; step S23). The adjusting unit 41 calculates the number of process steps using the obtained correction formula (step S24). In addition, the adjusting unit 41 obtains the number of surplus steps and the amount of surplus memory from the queue information table 43 (step S25). In accordance with a result of comparison between the number of surplus steps and the number of steps to be used to process the packet and a result of comparison between the amount of surplus memory and the amount of access memory, the adjusting unit 41 determines whether the packet can be processed within a predetermined period (step S26). When the packet can be processed within a predetermined period, the adjusting unit 41 stores the packet in the storage unit 42 of the best effort queue 40 and updates the queue information table 43 (Yes in step S26; step S27). When the packet can be processed within a predetermined period, the adjusting unit 41 stores the packet in the storage unit 42 of the best effort queue 40 and updates the queue information table 43 (Yes in step S26; step S27). When the adjusting unit 41 determines that the packet cannot be processed within a predetermined period, the adjusting unit 41 discards the packet (No in step S26; step S28).

When it is determined in step S21 that the packet is not an object for which the number of process steps is to be corrected, the processes of step S25 and the following steps are performed (No in step S21). When it is determined in step S22 that the adjusting unit 31 of the reservation queue 30 has corrected the number of steps, the processes of step S25 and the following steps are also performed (Yes in step S22).

<Packet Processing>

The calculating unit 51 calculates the total number of steps needed to process packets stored in the storage unit 32. The calculating unit 51 may refers to the cumulative number of process steps stored in the reservation information table 33 so as to obtain the number of steps needed to process the packets stored in the storage unit 32. The calculating unit 51 outputs the obtained value to the output unit 52. The output unit 52 determines a value (surplus value) obtained by subtracting the total number of steps needed to process the packets stored in the storage unit 32 from the total number of steps that the processing unit 53 can process within a predetermined processing period. The output unit 52 outputs the packets stored in the storage unit 32 to the processing unit 53, and then outputs the packets that can be processed in as many steps as are equal to or less than the surplus value from the storage unit 42 to the processing unit 53. The processing unit 53 processes the packets input from the output unit 52. Hence, the packets stored in the storage unit 32 are processed within the predetermined processing period.

A variation may be made such that packets are input from the storage unit 32 and the storage unit 42 to the processing unit 53 without the calculating unit 51 performing a calculation. In this case, after all of the packets stored in the storage unit 32 are input to the processing unit 53, the processing unit 53 processes packets obtained from the storage unit 42 until a predetermined processing period elapses since the start of obtainment of packets from the storage unit 32. A processing method for such a situation will be described with reference to FIG. 11.

Figure 11:
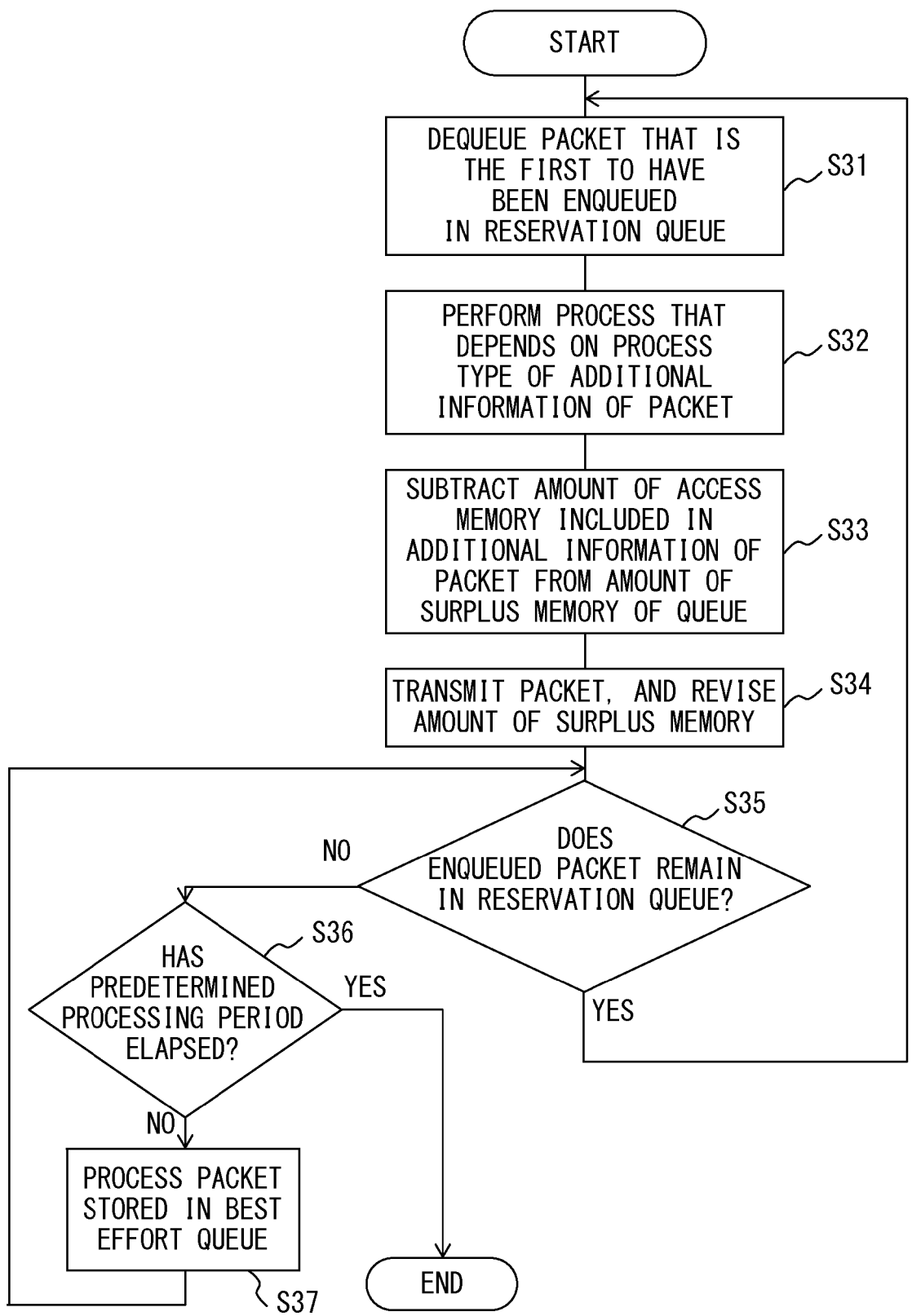
FIG. 11 is a flowchart illustrating an exemplary process performed by a controlling unit.

FIG. 11 is a flowchart illustrating an exemplary process performed by the controlling unit 50. Note that FIG. 11 is based on an example in which the processing apparatus 10 performs an relay process. The output unit 52 outputs, to the processing unit 53, a packet that is the first to have been put in the reservation queue 30 (step S31). The processing unit 53 performs a process that depends on the process type of the input packet and subtracts the amount of access memory included in additional information of the packet from the amount of surplus memory registered in the reservation information table 33 (steps S32 and S33). The processing unit 53 performs a transmitting process to relay processed packets and corrects the amount of surplus memory as appropriate (step S34). The output unit 52 determines whether a packet still remains in the storage unit 32 of the reservation queue 30 (step S35). When a packet remains in the storage unit 32 of the reservation queue 30, the processes of step S31 and the following steps are repeated (Yes in step S35). Meanwhile, when a packet does not remain in the storage unit 32 of the reservation queue 30, the output unit 52 determines whether the predetermined processing period has elapsed since the start of obtainment of packets from the storage unit 32 (No in step S35; step S36). When the predetermined processing period has not elapsed since the start of obtainment of packets from the storage unit 32, the output unit 52 outputs packets stored in the storage unit 42 of the best effort queue 40 to the processing unit 53 (No in step S36). The processing unit 53 processes the input packets (step S37). Then, the processes of step S35 and the following steps are repeated. Accordingly, when a preferential packet is put in the storage unit 32 after packets that were stored in the storage unit 42 of the best effort queue 40 are processed, as long as the predetermined period has not been elapsed, the processing for preferential packets is restarted. Meanwhile, when the predetermined processing period has elapsed since the start of obtainment of packets from the storage unit 32, a process for the next processing period starts (Yes in step S36).

As described above, packets to be processed during a predetermined period by the processing apparatus 10 are selected using the amount of processing to be applied to each of the packets and the amount of processing that can be preferentially performed during the predetermined period, and the selected packets are stored in the storage unit 32. The processing unit 53 preferentially processes the packets stored in the storage unit 32 so that a delay in processing the packets stored in the storage unit 32 can be correctly estimated. Therefore, designing the processing apparatus to set a large amount of processing to be applied to packets stored in the storage unit 32 allows all preferential packets to be stored in the reservation queue, with the result that a delay in processing the preferential packets can be correctly estimated.

In addition, the processing unit 53 preferentially allocates the amount of processing to be used during a processing period to the processing of packets obtained from the storage unit 32 and distributes the remainder between packets obtained from the storage unit 42. Hence, even when the amount of processing needed to process packets stored in the storage unit 32 is smaller than a predicted amount, the processing capacity of the processing unit 53 can be effectively used by processing packets stored in the storage unit 42.

<Second Embodiment>

A second embodiment will be described with reference to an example in which the respective amounts of packets to be stored in the reservation queue 30 and the best effort queue 40 are changed in accordance with a change in the number of packets transmitted or received using a flow for which a process to be performed via the reservation queue 30 has been reserved. In this case, for example, the upper limit of the number of steps allocated to packets that are stored in the reservation queue 30 and that are to be processed by the processing unit 53 during a predetermined period may be determined to change the number of steps to be used to process packets via the reservation queue 30 without exceeding the upper limit. The length of the period used in setting the upper limit is selected in accordance with requirements regarding the contract with the user or requirements regarding an implementation, and the period is, for example, one hour, one day, one week, or one month. The length of the period used in setting the upper limit may hereinafter be referred to as an "adjustment cycle". The process of setting a reservation on the processing apparatus 10 and the process of classifying received packets are similar to those in the first embodiment. The method for correcting the number of process steps per packet and the process performed by the distributing unit 26 are also similar to those in the first embodiment. However, the processing apparatus 10 includes a reservation information table 35 instead of the reservation information table 33.

FIG. 12 illustrates an example of the reservation information table 35 for use in the second embodiment. The reservation information table 35 indicates an example in which a reference processing period is one second and an adjustment cycle is one hour, but the processing period and the length of the adjustment cycle may change in accordance with requirements regarding the contract with the user or requirements regarding an implementation.

The reservation information table 35 includes "standard number of steps", "upper limit of number of steps", "re-enqueue rate", "upper limit of re-enqueue rate", "cumulative-total number of steps", and "upper limit of cumulative-total number of steps", and further includes the information elements of the reservation information table 33. "standard number of steps" indicates the number of process steps performed per second by the processing unit 53 to process packets included in the storage unit 32 under a condition in which the number of allocated steps does not change. "upper limit of number of steps" indicates the upper limit of the possible number of allocated steps and is set in advance. "re-enqueue rate" indicates the percentage of the number of packets output from the adjusting unit 31 to the adjusting unit 41 relative to the number of packets input to the adjusting unit 31. "upper limit of re-enqueue rate" indicates the upper limit of an allowable re-enqueue rate. "cumulative-total number of steps" indicates the cumulative total value of the number of steps performed during the adjustment cycle. "upper limit of cumulative-total number of steps" indicates the upper limit of the amount of processing for enabling the setting of the number of allocated steps that is larger than the standard number of steps. When the cumulative-total number of steps exceeds the upper limit of the cumulative-total number of steps, the adjusting unit 31 corrects the reservation information table 35 to prevent the number of steps exceeding the standard number of steps from being set as the number of allocated steps.

The following will describe an exemplary process performed when the processing apparatus 10 holds the reservation information table 35a depicted in FIG. 12. In the example of the parameter information table 25a, the number of allocated steps is 200 million per second, and the upper limit of the number of steps is set to one billion per second. The setting is such that the number of steps can be changed by the hour, and the number of allocated steps can be set to at most 1.44 trillion per hour. Using the number of surplus steps and the amount of surplus memory, both registered in the reservation information table 35a, the adjusting unit 31 determines whether a packet can be stored in the storage unit 32. When a packet cannot be stored in the storage unit 32, the adjusting unit 31 outputs the packet to the adjusting unit 41 and changes the value of the re-enqueue rate. A process performed after the packet is stored in the storage unit 32, a process performed after the packet is output to the adjusting unit 41, and a process performed when the distributing unit 26 distributes the packet to the adjusting unit 41 are similar to those in the first embodiment.

Assume, for example, that packets for which a process to be performed using the reservation queue 30 has been reserved are input to the adjusting unit 31 at apace exceeding the number of allocated steps by 15%. In this case, the adjusting unit 31 outputs as many packets as correspond to the 15% excess to the adjusting unit 41 and sets 15% as the re-enqueue rate. Values such as the number of surplus steps and the amount of consumed memory also change, as in the case of the first embodiment. In this example, through, for example, a process performed by the adjusting unit 31 and a following process performed by the processing unit 53, the reservation information table 35a is updated as indicated by the reservation information table 35b (FIG. 12).

Accordingly, since the re-enqueue rate has exceeded the upper limit of the re-enqueue rate, the adjusting unit 31 increases the number of allocated steps in accordance with the difference therebetween. In this case, the adjusting unit 31 makes a setting such that the number of allocated steps does not exceed the upper limit of the number of steps. In the example of the reservation information table 35b, the upper limit of the re-enqueue rate is 10%, while the re-enqueue rate is 15%. Accordingly, the adjusting unit 31 makes a calculation and recognizes that the difference between the re-enqueue rate and the upper limit of the re-enqueue rate is 5%, and determines whether the number of currently allocated steps can be increased by 5%. The number of currently allocated steps is 200 million per second, and accordingly the adjusting unit 31 makes a calculation and recognizes that an increase of 5% will achieve 210 million per second as the number of allocated steps. In addition, the adjusting unit 31 compares the calculated value with the upper limit of the number of steps. Since the upper limit of the number of steps is one billion per second, the adjusting unit 31 determines that 210 million can be set as the number of allocated steps. Accordingly, the adjusting unit 31 changes the reservation information table 35b as indicated by the reservation information table 35c in FIG. 13 and reports details of the change to the adjusting unit 41. The adjusting unit 41 determines the increment in the number of steps allocated to process packets stored in the reservation queue 30 and updates the queue information table 43 by subtracting the increment from the number of steps allocated to the best effort queue 40.

Then, using the reservation information table 35c and the updated queue information table 43, the processing apparatus 10 determines whether a packet can be stored in the storage unit 32 or the storage unit 42. A process performed after the determination is made is similar to the process performed in the first embodiment.

Assume that, when the process performed using the reservation information table 35c starts, the re-enqueue rate is suppressed to 10%, as indicated by the reservation information table 35d (FIG. 13), because of an increase in the number of process steps allocated to process packets stored in the reservation queue 30. After this, however, when the amount of transmission and reception of packets of a flow for which a process to be performed using the reservation queue 30 has been reserved continuously increases, the allocation of process steps to the packets stored in the reservation queue 30 changes as described above with reference to FIGS. 12 and 13. Assume that, as a result, the number of steps allocated to the packets stored in the reservation queue 30 has reached 980 million per second.

Assume that, although the number of steps allocated to the packets stored in the reservation queue 30 is 980 million per second, packets are input to the adjusting unit 31 at apace exceeding the number of allocated steps by 20%. In this case, the processing apparatus 10 holds the reservation information table 35e depicted in FIG. 14. As the reservation information table 35e indicates, since the re-enqueue rate exceeds the upper limit of the re-enqueue rate, the adjusting unit 31 increases the number of allocated steps to the upper limit of the number of steps but does not increase the number of allocated steps to a value that is greater than the upper limit of the number of steps. Then, as the reservation information table 35f (FIG. 14) indicates, even though the re-enqueue rate exceeds the upper limit of the re-enqueue rate after the number of allocated steps reaches the upper limit of the number of steps, the number of allocated steps is not increased.

Assume that the process continues and that this has caused the cumulative-total number of steps to reach the upper limit of the cumulative-total number of steps, as the reservation information table 35g in FIG. 15 indicates. In this case, the adjusting unit 31 determines that processing has been performed up to the upper limit of the amount of processing allowed to be performed with the standard number of steps exceeded, and returns the number of allocated steps to the standard number of steps. Accordingly, the reservation information table 35g is updated as indicated by the reservation information table 35h (FIG. 15). Once the cumulative-total number of steps reaches the upper limit of the cumulative-total number of steps, even when a load increases, the adjusting unit 31 does not increase the number of allocated steps until the next adjustment cycle starts. Thus, the reservation information table 35h changes with an increase in the load, as indicated by the reservation information table 35i in FIG. 16.

When the next adjustment cycle starts, the cumulative-total number of steps is reset, i.e., set to 0. Accordingly, the reservation information table 35i is updated as indicated by the reservation information table 35j. After this, as described above with reference to FIGS. 12-14, the number of allocated steps also changes with the number of received packets for which a process to be performed via the reservation queue 30 has been reserved.

Assume that, after the number of allocated steps increases to 450 million per second, the re-enqueue rate has become 0% due to a decrease in the number of transmitted or received packets. Further assume that the processing apparatus 10 holds the reservation information table 35k depicted in FIG. 17. Maintaining a re-enqueue rate of 0% for a predetermined period causes the adjusting unit 31 to decrease the number of allocated steps at a rate determined in advance. In this case, the adjusting unit 31 prevents the number of allocated steps from becoming smaller than the standard number of steps. When, for example, the adjusting unit 31 changes the number of allocated steps to 360 million per second, the reservation information table 35k is updated as indicated in the reservation information table 35m. In addition, decreasing the number of received packets that use the reservation queue 30 changes the reservation information table 35m as indicated by the reservation information table 35n in FIG. 18. As the reservation information table 35h indicates, even in the case where the number of allocated steps is close to the standard number of steps, when the re-enqueue rate remains 0%, the adjusting unit 31 sets the number of allocated steps as the standard number of steps. Accordingly, the reservation information table 35*n* changes as indicated by the reservation information table 35*p*. After this, even when a re-enqueue rate of 0% still remains, the adjusting unit 31 does not make the number of allocated steps smaller than the standard number of steps. The adjusting unit 31 may be configured to decrease the number of allocated steps when the re-enqueue rate becomes equal to or less than a predetermined threshold Th, as depicted in FIGS. 17 and 18. Note that the threshold Th is less than the upper limit of the re-enqueue rate.

As indicated in the second embodiment, changing the number of allocated steps in accordance with a load allows the number of packets that can be stored in the reservation queue 30 to be adjusted in accordance with traffic. In the processes performed by the controlling unit 50, packets are processed by the processing unit 53 starting preferentially from the packets stored in the storage unit 32 of the reservation queue 30, as described above with reference to the first embodiment. Accordingly, even when traffic varies, a delay time can be readily predicted for the packets of a flow for which a reservation has been made.

<Third Embodiment>

Figure 19:
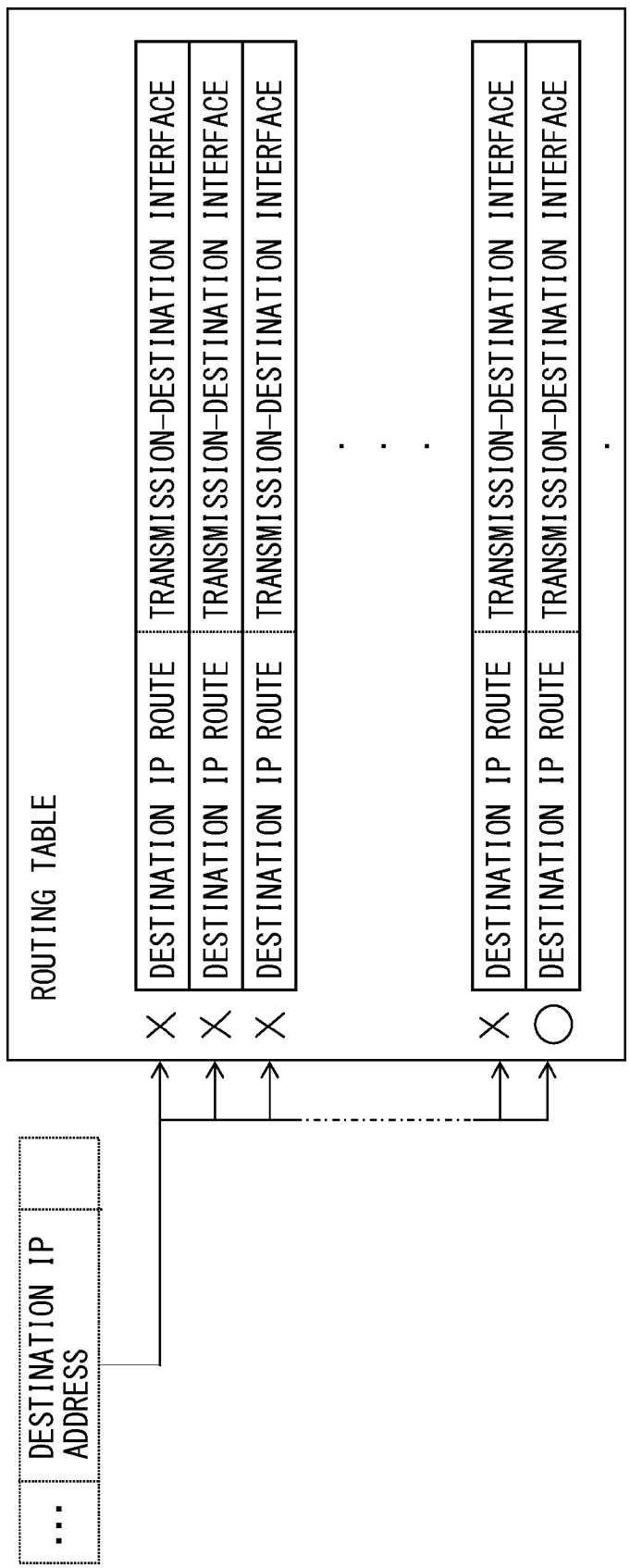
FIG. 19 illustrates an exemplary process performed in a third embodiment.

With reference to the third embodiment, descriptions will be given of a method for changing the number of process steps in accordance with the number of entries of a routing table when the type of a process to be performed on a packet is an L3 relay process. When the type of a process to be performed on a packet is an L3 relay process, processes performed by the processing unit 53 include a process of searching the routing table using the destination IP address of the input packet as a key. When the routing table includes many entries, it may take a long time to find a transfer destination depending on a search algorithm used by the processing unit 53. When, for example, the routing table is a linear table as depicted in FIG. 19, the processing unit 53 searches route entries of the list in order starting from the head of the entries of the routing table. Thus, when an entry to be used is recorded at the end of the linear table as depicted in FIG. 19, the processing unit 53 needs a long time to perform processing.

Accordingly, for a packet for which the L3 relay process is to be performed, the adjusting unit 31 makes a correction using the number of entries of the routing table in the calculating of the number of process steps. For example, the adjusting unit 31 may calculate the number of steps needed to process one entry in advance and may estimate the product of the number of steps needed to process one entry and the number of entries as the number of steps needed to process the packet for which the L3 relay process is to be performed. In addition, the processing unit 53 also performs all of the processes other than the searching of the routing table with reference to the packet, and an estimate of the number of process steps is designated by additional information. In the third embodiment, the number of steps needed to process the packet for which the L3 relay process is to be performed, including the number of the other process steps designated by additional information, is calculated using the following formula.

$$\text{Number of steps} = A + B \times \text{number of entries}$$

In this formula, A indicates the number of steps needed for all of the processes other than the searching of the routing table, i.e., a number designated by additional information, and B indicates the number of steps needed to process one entry of the routing table. A correction formula for the L3 relay process is also stored in the correction table 34.

In this way, correctly calculating the number of steps needed to process packets for which the L3 relay process is to be performed facilitates the estimating of a delay time for packets to be preferentially processed, even when the number of entries of the routing table changes.

As described above, using the packet processing apparatus in accordance with the embodiment maintains a delay in processing preferential packets within a predetermined period.

<Other Items>

Embodiments are not limited to those described above and can have various variations, some examples of which will be described in the following.

(1) Process Based on Content Addressable Memory (CAM)

In the processing of a packet for which the L3 relay process is to be performed, the processing unit 53 may search the routing table using a CAM. Performing a route searching process using the CAM allows the processing unit 53 to determine, in one computing operation, an entry for a destination that is the most similar to a search-target destination IP address. Assume that 600 steps are needed for one operation when the processing unit 53 processes the routing table in a software-based process without using the CAM, and that the number of allocated steps registered in the reservation information table 33 is 20000 per second. When all processing-object packets are packets for which the L3 relay process is to be performed, the CAM may be used to set, as the number of allocated steps, a value that is 600 times of the number of allocated steps that would be used in a software-based process. Accordingly, when the processing unit 53 can perform the CAM-based process, the adjusting unit 31 may register a value that is 600 times of the number of allocated steps in the reservation information table 33 so that as many packets as are in balance with a decrease in the number of steps caused by the CAM can be stored in the storage unit 32. Descriptions have been given of an example in which L3 relay is performed using the CAM, but such descriptions are also applicable to a situation in which another processing circuit decreases the number of steps of another process. That is, the product of the value obtained by dividing the number of steps needed in the software process by the number of steps needed when a processing circuit is used and the value of the number of allocated steps determined with reference to the software-based process may be set in the reservation information table 33 as the number of allocated steps.

(2) Shaper-Scheme-Based Process

In determining the amount of packets to be stored in the storage unit 32, the adjusting unit 31 may use a shaper scheme. In this case, as long as a threshold is not reached, as many packets as are exceeding a reserved amount are stored in the storage unit 32 during a certain processing period. When as many packets as are exceeding the reserved amount are not processed by the processing unit 53 during the processing period, the packets are processed during the following processing period. When packets are put into the storage unit 32 even after the number of allocated steps is exceeded, the number of surplus steps becomes a negative value. Note that the allowable range of the number of surplus steps is set in advance in accordance with service requirements guaranteed for the user, e.g., the range of a delay and jitter.

(3) System Achieved Via Network

Figure 20:
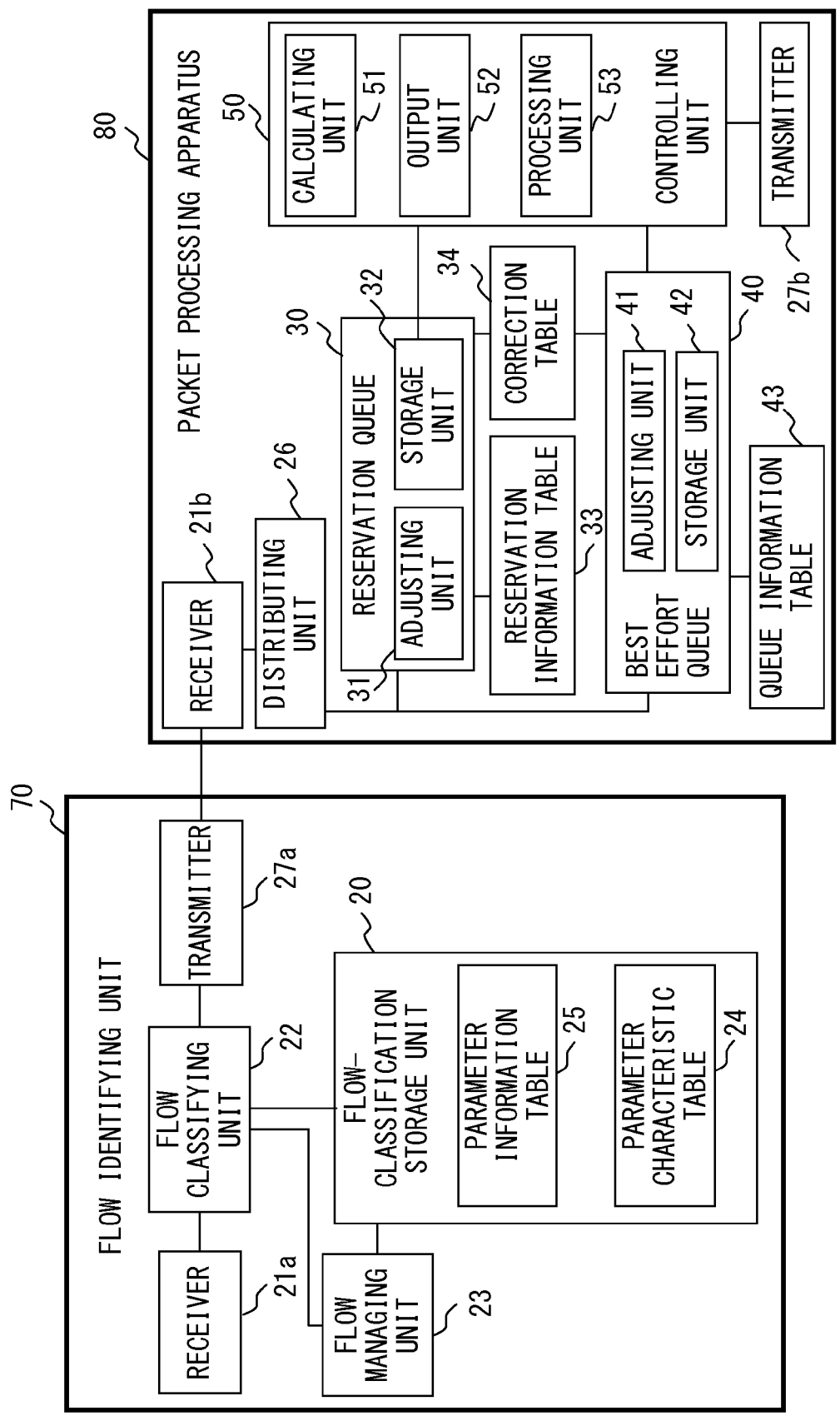
FIG. 20 illustrates an exemplary system to which a method in accordance with an embodiment is applicable.
Figure 21:
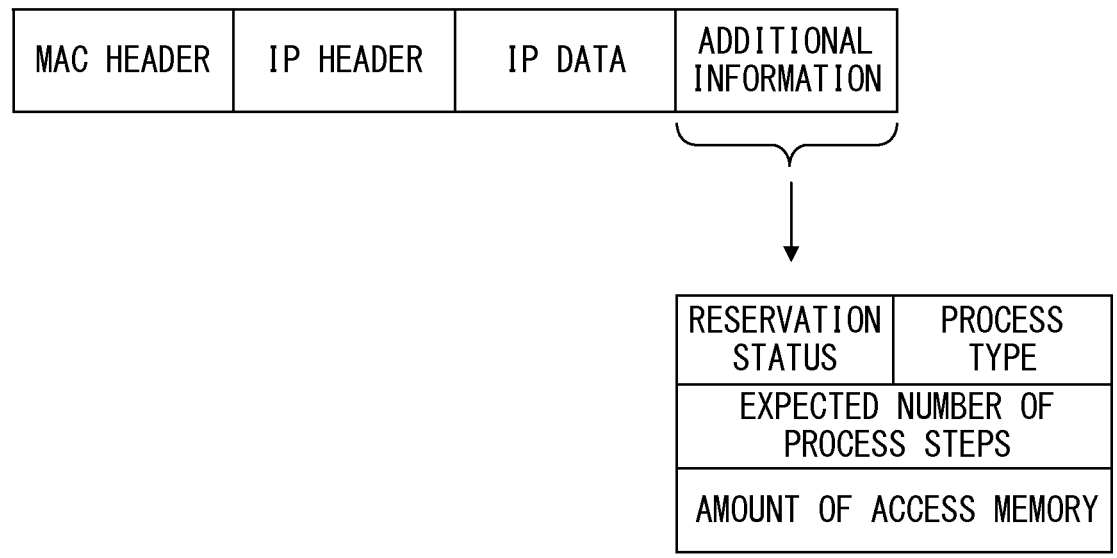
FIG. 21 illustrates an exemplary packet format.

For simplicity, descriptions have been given of examples in which the processing apparatus 10 is a single apparatus, but the processing apparatus 10 may be divided into two apparatuses, one of which serves as the flow identifying unit 11 and the other of which serves as the packet processing unit 12. FIG. 20 depicts an exemplary system usable to cause two apparatuses to achieve various embodiments, including the first to third embodiments. A flow identifying apparatus 70 is operated in the same manner as the flow identifying unit 11 of the first to third embodiments. However, the flow classifying unit 22 of the flow identifying apparatus 70 adds additional information to a packet and outputs the packet to a transmitter 27a. FIG. 21 depicts an exemplary format of the packet output to the transmitter 27a. In the example of FIG. 21, additional information is located at the end of the packet. The format of the additional information is identical with the format described above with reference to FIG. 6. FIG. 21 depicts an example of the format of the packet, and hence, in accordance with an implementation, the additional information may be stored in another region within the packet.

The transmitter 27a transmits a packet that includes additional information to a packet processing apparatus 80. Operations of the distributing unit 26, the reservation queue 30, the reservation information table 33, the correction table 34, the best effort queue 40, the queue information table 43, the best effort queue 40, and the transmitter 27b of the packet processing apparatus 80 are similar to the operations of these elements in the first to third embodiments. The receiver 21b of the packet processing apparatus 80 outputs the received packet to the distributing unit 26. The hardware configurations of both the flow identifying apparatus 70 and the packet processing apparatus 80 are identical with those described above with reference to FIG. 3.

(4) The information elements within the tables used in the descriptions are examples, and the types of information elements included in one table may change in accordance with an implementation. For example, the parameter information table 25 and the packet characteristic table 24 may be combined into one table, or may be divided into three or more tables.

(5) The processing apparatus 10, the flow identifying apparatus 70, and the packet processing apparatus 80 may all be provided within a virtual network formed using a technology such as Software Defined Networking (SDN).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet processing apparatus comprising:
   a receiver to receive packets;
   a processing circuit to process the received packets;
   a first cache; and
   a second cache, wherein
   the processing circuit
      stores first packets in the first cache when the sum of a first amount of processing to be applied to packets stored in the first cache and a second amount of processing to be applied to the first packets does not exceed a set value set as an amount of processing applicable to preferential packets within a predetermined period, wherein the first packets are judged to be preferential packets, and the preferential packets are desired to be preferentially processed by the packet processing apparatus,
      stores, in the second cache, packets judged to be packets other than the preferential packets;
      stores second packets in the second cache when the sum of the first amount of processing to be applied to the packets stored in the first cache and the second amount of processing to be applied to the first packets exceeds the set value, wherein the second packets are judged judged to be the preferential packets excluding the first packet, and
      processes the first packets stored in the first cache, reads, from the second cache, as many packets as are processable at a surplus value, and processes the read packets, the surplus value being obtained by subtracting the second amount of processing to be applied to the first packets stored in the first cache from a third amount of processing that the processing circuit is capable of performing within the predetermined period.

2. The packet processing apparatus according to claim 1, further comprising:
   a memory to store a candidate type of processing to be applied to the preferential packets and function information in association with each other, the function information indicating, as a function of a length of a processing-object packet that is to be subjected to the candidate type of processing, an amount of processing to be applied to the processing-object packet, wherein
   the processing circuit
      when the amount of processing to be applied to the preferential packets changes with lengths of the preferential packets, calculates the amount of processing to be applied to the preferential packets using function information associated with the type of processing to be applied to the preferential packets and the lengths of the preferential packets, and
      using the amount of processing that has been calculated, determines whether the preferential packets are storable in the first cache.

3. The packet processing apparatus according to claim 1, further comprising:
   a transmitter to transmit a packet that has been processed by the processing circuit, wherein
   the memory further includes route information used when the processing circuit performs a relay process directed to a destination of a packet input to the processing circuit, and
   as a number of routes included in the route information increases, the processing circuit increases the amount of processing to be applied to the preferential packets.

4. The packet processing apparatus according to claim 1, wherein
   the memory further stores an upper limit of the amount of processing that the processing circuit is capable of performing within the predetermined period, and a lower limit of the amount of processing that the processing circuit is capable of performing within the predetermined period, and the processing circuit
- increases the set value to a value that does not exceed the upper limit when an amount of preferential packets that are not storable in the first cache exceeds a first threshold, and
- decreases the set value to a value that is equal to or higher than the lower limit when the amount of preferential packets that are not storable in the first cache becomes less than a second threshold, the second threshold being lower than the first threshold.

5. A packet processing method executed by a processing apparatus that includes a first cache and a second cache, the packet processing method comprising:
- receiving packets;
- storing first packets, in the first cache when the sum of a first amount of processing to be applied to packets stored in the first cache and a second amount of processing to be applied to the first packets does not exceed a set value set as an amount of processing applicable to the preferential packets within a predetermined period, the first packet being judged to be preferential packets, the preferential packets being desired to be preferentially processed by the processing apparatus;
- storing, in the second cache, packets judged to be packets other than preferential packets;
- storing second packets in the second cache when the sum of the first amount of processing to be applied to the packets stored in the first cache and the second amount of processing to be applied to the first packets exceeds the set value, the second packets being judged to be the preferential packet excluding the first packets;
- processing the first packets stored in the first cache; and
- reading, from the second cache, as many packets as are processable at a surplus value, and processing the read packets, the surplus value being obtained by subtracting the second amount of processing to be applied to the first packets stored in the first cache from a third amount of processing that is capable of being performed within the predetermined period.

6. A packet processing system comprising:
- a first apparatus that includes a first cache and a second cache; and
- a second apparatus to transmit preferential packets and normal packets to the first apparatus, the preferential packets being packets to be desired to be preferentially processed, and the normal packets being packets other than the preferential packets, wherein the first apparatus
- receives the preferential packets and the normal packets from the second apparatus,
- stores first preferential packets in the first cache when the sum of a first amount of processing to be applied to packets stored in the first cache and a second amount of processing to be applied to the first preferential packets does not exceed a set value set as an amount of processing applicable to the preferential packets within a predetermined period, wherein the first preferential packet is judged to be the preferential packets,
- stores the normal packets in the second cache,
- stores second preferential packets in the second cache when the sum of the first amount of processing to be applied to the packets stored in the first cache and the second amount of processing to be applied to the first preferential packets exceeds the set value, wherein the second preferential packets are judged to be the preferential packets excluding the first preferential packets,
- processes the first preferential packets stored in the first cache, and
- reads, from the second cache, as many packets as are processable at a surplus value, and processes the read packets, the surplus value being obtained by subtracting the second amount of processing to be applied to the first preferential packets stored in the first cache from a third amount of processing that the first apparatus is capable of performing within the predetermined period.

7. A non-transitory computer-readable recording medium having stored therein a program for causing a processing apparatus that includes a first cache and a second cache to execute a process for a packet processing, the process comprising:
- receiving packets,
- storing first packets in the first cache when the sum of a first amount of processing to be applied to packets stored in the first cache and a second amount of processing to be applied to the first packets does not exceed a set value set as an amount of processing applicable to preferential packets within a predetermined period, the first packet being judged to be the preferential packets, the preferential packets being desired to be preferentially processed by the processing apparatus;
- storing, in the second cache, packets judged to be packets other than preferential packets,
- storing second packets in the second cache when the sum of the first amount of processing to be applied to the packets stored in the first cache and the second amount of processing to be applied to the first packets exceeds the set value, the second packets being judged to be the preferential packets excluding the first packets;
- processing the first packets stored in the first cache, and
- reading, from the second cache, as many packets as are processable at a surplus value, and processing the read packets, the surplus value being obtained by subtracting the second amount of processing to be applied to the first packets stored in the first cache from a third amount of processing that is capable of being performed within the predetermined period.

* * * * *